US008065156B2

(12) United States Patent
Gazdzinski

(10) Patent No.: US 8,065,156 B2
(45) Date of Patent: Nov. 22, 2011

(54) ADAPTIVE INFORMATION PRESENTATION APPARATUS AND METHODS

(76) Inventor: Robert F. Gazdzinski, San Diego, CA (US)

( * ) Notice: Subject to any disclaimer, the term of this patent is extended or adjusted under 35 U.S.C. 154(b) by 65 days.

(21) Appl. No.: 12/711,857

(22) Filed: Feb. 24, 2010

(65) Prior Publication Data

US 2010/0217657 A1   Aug. 26, 2010

Related U.S. Application Data

(60) Continuation of application No. 11/506,975, filed on Aug. 17, 2006, now Pat. No. 7,711,565, which is a division of application No. 10/935,957, filed on Sep. 7, 2004, now Pat. No. 7,093,693, which is a division of application No. 10/651,451, filed on Aug. 29, 2003, now Pat. No. 6,988,071, which is a continuation of application No. 09/330,101, filed on Jun. 10, 1999, now Pat. No. 6,615,175.

(51) Int. Cl.
*G10L 15/00* (2006.01)

(52) U.S. Cl. .................. 704/275; 704/270; 707/999.003; 187/396; 369/30.01

(58) Field of Classification Search .................. 704/270, 704/275; 707/999.003; 187/396; 369/30.01
See application file for complete search history.

(56) References Cited

U.S. PATENT DOCUMENTS

| | | | |
|---|---|---|---|
| 3,388,376 A | 6/1968 | Magee | |
| 4,534,056 A | 8/1985 | Feilchenfeld et al. | |
| 4,577,177 A | 3/1986 | Marubashi | |
| 4,708,224 A | 11/1987 | Schrooder | |
| 4,749,062 A | 6/1988 | Tsuji et al. | |
| 4,979,593 A | 12/1990 | Watanabe et al. | |
| 4,995,479 A | 2/1991 | Fujiwara et al. | |
| 5,042,620 A | 8/1991 | Yoneda et al. | |
| 5,056,629 A | 10/1991 | Tsuji et al. | |
| 5,159,163 A | 10/1992 | Bahjat et al. | |
| 5,200,583 A | 4/1993 | Kupersmith et al. | |
| 5,255,341 A | 10/1993 | Nakajima | |
| 5,287,266 A | 2/1994 | Malec et al. | |
| 5,295,064 A | 3/1994 | Malec et al. | |
| 5,463,209 A | 10/1995 | Figh et al. | |
| 5,485,897 A | 1/1996 | Matsumoto et al. | |

(Continued)

FOREIGN PATENT DOCUMENTS

JP   52018653 A   2/1977

(Continued)

OTHER PUBLICATIONS

D.K. Kahane (Mar. 16, 1991) "Hitachi 1991 Technology Exhibition, Tokyo," Asian Technology Information Program, pp. 1-14.

(Continued)

*Primary Examiner* — Daniel D Abebe
(74) *Attorney, Agent, or Firm* — Gazdzinski & Associates, PC

(57) ABSTRACT

An adaptive information presentation apparatus and associated methods. In one embodiment, the apparatus comprises a computer readable medium having at least one computer program disposed thereon, the at least one program being configured to adaptively present (e.g., display or play out via an audio system) information that is related or in response to inputs provided via an input device such as a for example touch-screen display device. In one variant, the at least one program analyzes user input to determine a context of the input, and selects advertising related to the context for presentation to the user.

38 Claims, 24 Drawing Sheets

U.S. PATENT DOCUMENTS

| | | | |
|---|---|---|---|
| 5,551,532 A | 9/1996 | Kupersmith | |
| 5,606,154 A | 2/1997 | Doigan et al. | |
| 5,689,094 A | 11/1997 | Friedli et al. | |
| 5,749,443 A | 5/1998 | Romao | |
| 5,844,181 A | 12/1998 | Amo et al. | |
| 5,887,139 A | 3/1999 | Madison et al. | |
| 5,918,222 A | 6/1999 | Fukui et al. | |
| 5,932,853 A | 8/1999 | Friedli et al. | |
| 5,955,710 A | 9/1999 | DiFranza | |
| 5,979,757 A | 11/1999 | Tracy et al. | |
| 5,984,051 A | 11/1999 | Morgan et al. | |
| 6,011,839 A | 1/2000 | Friedli et al. | |
| 6,073,727 A | 6/2000 | DiFranza et al. | |
| 6,078,928 A | 6/2000 | Schnase et al. | |
| 6,082,500 A | 7/2000 | Amo et al. | |
| 6,202,008 B1 | 3/2001 | Beckert et al. | |
| 6,202,799 B1 | 3/2001 | Drop | |
| 6,206,142 B1 | 3/2001 | Meacham | |
| 6,223,160 B1 | 4/2001 | Kostka et al. | |
| 6,236,968 B1 | 5/2001 | Kanevsky et al. | |
| 6,349,797 B1 | 2/2002 | Newville et al. | |
| 6,397,976 B1 | 6/2002 | Hale et al. | |
| 6,421,305 B1 | 7/2002 | Gioscia et al. | |
| 6,460,036 B1 | 10/2002 | Herz | |
| 6,466,232 B1 | 10/2002 | Newell et al. | |
| 6,504,571 B1 | 1/2003 | Narayanaswami et al. | |
| 6,571,279 B1 | 5/2003 | Herz et al. | |
| 6,587,835 B1 | 7/2003 | Treyz et al. | |
| 6,606,644 B1 * | 8/2003 | Ford et al. | 709/203 |
| 6,615,175 B1 | 9/2003 | Gazdzinski | |
| 6,651,045 B1 | 11/2003 | Macaulay | |
| 6,799,327 B1 * | 9/2004 | Reynolds et al. | 725/42 |
| 6,801,792 B1 | 10/2004 | Schuster et al. | |
| 6,990,312 B1 | 1/2006 | Gioscia et al. | |
| 7,136,853 B1 | 11/2006 | Kohda et al. | |
| 2004/0104842 A1 | 6/2004 | Drury et al. | |
| 2005/0239402 A1 | 10/2005 | Gioscia et al. | |
| 2009/0077100 A1 * | 3/2009 | Hancock et al. | 707/10 |
| 2010/0023392 A1 * | 1/2010 | Merriman et al. | 705/14.42 |

FOREIGN PATENT DOCUMENTS

| | | | |
|---|---|---|---|
| JP | 52039237 A | 3/1977 |
| JP | 01226681 A | 9/1989 |
| JP | 03272977 A | 12/1991 |
| JP | 05017083 A | 1/1993 |
| JP | 05058564 A | 3/1993 |
| JP | 05201624 A | 8/1993 |

OTHER PUBLICATIONS

Karen Jacobs (Dec. 7, 1999) "Elevator Maker to Add Commercial Touch," The Wall Street Journal, pp. 1-2.

Lewis Perdue (Jul. 20, 1999) "Forget Elevator Music, Here Comes Elevator Internet," Internet VC Watch, pp. 1-2.

Stevens Institute of Technology, Spring 1999 Final Report, pp. 1-12.

Kenji Yoneda, et al. (Dec. 1997) "Multi-Objective Elevator Supervisory-Control System with Individual Floor-Situation Control," Hitachi Review, p. 1.

* cited by examiner

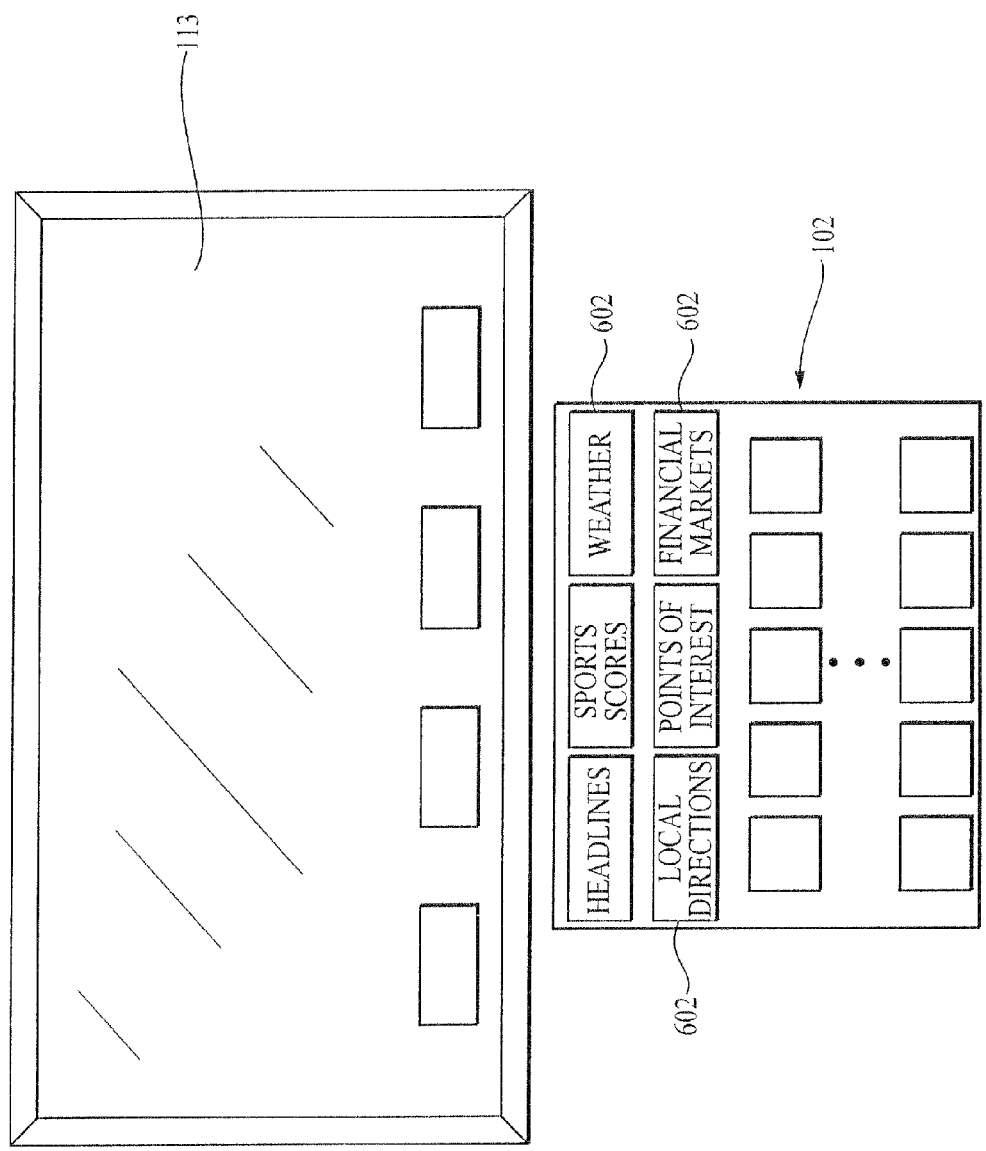

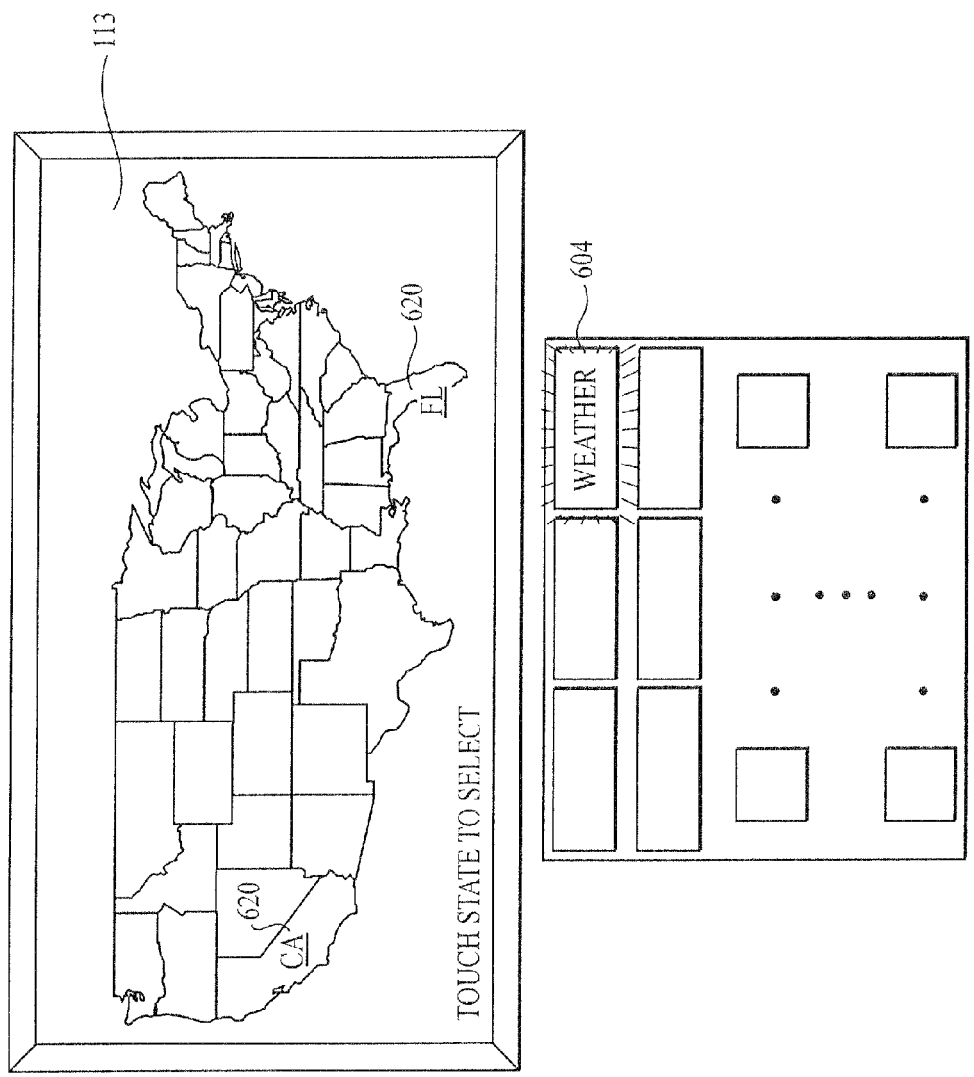

ADAPTIVE INFORMATION PRESENTATION APPARATUS AND METHODS

This application is a continuation of and claims priority to co-owned U.S. patent application Ser. No. 11/506,975 filed Aug. 17, 2006 now U.S. Pat. No. 7,711,565 and entitled "SMART ELEVATOR SYSTEM AND METHOD", which is a divisional of and claims priority to co-owned U.S. patent application Ser. No. 10/935,957 filed Sep. 7, 2004 and entitled "SMART ELEVATOR SYSTEM AND METHOD", now U.S. Pat. No. 7,093,693, which is a divisional of co-owned U.S. patent application Ser. No. 10/651,451 filed Aug. 29, 2003 and entitled "SMART ELEVATOR SYSTEM AND METHOD", now U.S. Pat. No. 6,988,071, which is a continuation of co-owned U.S. patent application Ser. No. 09/330,101 filed Jun. 10, 1999 and entitled "SMART ELEVATOR SYSTEM AND METHOD", now U.S. Pat. No. 6,615,175, each of the foregoing incorporated into the present application by reference in its entirety. This application is also related to co-pending and co-owned U.S. patent application Ser. No. 12/703,666 filed Feb. 10, 2010 entitled "Adaptive Advertising Apparatus and Methods", to co-pending and co-owned U.S. patent application Ser. No. 12/704,431 filed Feb. 11, 2010 entitled "Adaptive Advertising Apparatus and Methods", and to Ser. No. 12/711,692 filed contemporaneously herewith on Feb. 24, 2010 entitled "ADAPTIVE INFORMATION PRESENTATION APPARATUS AND METHODS" each of which is incorporated herein by reference in its entirety.

BACKGROUND OF THE INVENTION

1. Field of the Invention

The present invention relates to the field of personnel transport apparatus, and specifically to elevators and similar devices for transporting people from one location to another which incorporate various information technologies.

2. Description of Related Technology

Elevators and similar personnel transport devices (such as moving walkways or shuttles) are important aspects of modern urban life. Commonly used in office buildings, airports, shopping malls, and other large structures, these devices transport large numbers of people and equipment between two locations on a routine basis. Elevators in particular are widely used throughout the world.

Depending on loading, a person may spend up to several minutes on an elevator during travel between floors. Significant amounts of time may also be spent waiting for the elevator to arrive when called. This time is usually "dead" from the standpoint that very little can be accomplished or very few tasks undertaken during these few minutes. However, often times an individual may require information which will be of use after leaving the elevator. For example, the person may wish to obtain travel information such as directions to the nearest airport or public transportation node, or the location of a nearby restaurant. Weather-related information or traffic reports may also be useful. A plethora of different types of information, including financial data, breaking news headlines, sports scores and the like may also be of interest to one waiting for or riding on an elevator or other transport device.

An associated problem relates to determining the location of a person, firm, or store within a building when unfamiliar. Building directories are often posted in the lobby of the building, yet these require the user to manually or visually locate the name of the person, firm, or store which they are looking for, and remember the location information associated therewith. Additionally, such directories often do not provide precise location information, but rather merely a floor number and/or suite number. The user often times does not have a graphical representation of the desired location in relation to the elevators, thereby resulting in additional wasted time in finding the location once off of the elevator. Even if a graphical display is provided, it often requires the user to spatially orient themselves to determine relative location.

Security is also a concern when riding elevators late at night or to remote locations. Many elevator systems are used partly or entirely within parking garages, which often may be sparsely populated at off hours. People are all too frequently assaulted or robbed when departing from elevators under such conditions. Unfortunately, existing elevator systems do not have the facility to provide the occupant(s) with the ability to selectively observe the area immediately surrounding the elevator doors on one or more destination floors, or otherwise take precautions to enhance their security.

Another problem associated with existing elevator systems relates to their loading capacity. Often, especially at peak use hours such as during the noon hour, the call buttons for several different floors within a building will be activated, and elevator cars which are at or near their loading capacity will respond. With no additional room available in the elevator, the person depressing the call button on a given floor is left to wait for the elevator doors to close, depress the call button again, and wait for another (hopefully partially vacant) car to arrive. This process not only delays the person waiting for the car, but also those on the elevator car(s), and those waiting on other floors.

In addition to the foregoing, many elevators must have a means of restricting access to certain floors during certain time periods while not interfering with other operations. These elevators generally also include means by which certain users may gain access to the restricted floors, such as a magnetic striped card which is inserted into a card reader on the elevator. However, such card readers are prone to wear and having to re-swipe the card several times in order to obtain access. Furthermore, as the card wears due to repeated swiping or bending (such as when left in the pocket of the individual carrying the card), the card will be more prone to failure and will eventually require replacement. Also, such cards are prone to unauthorized use. Someone stealing or finding the lost card can simply insert it into the card reader of the elevator and gain access to the restricted floor(s). It is also noted that since access is restricted to certain floors typically during late-night or weekend hours, HVAC and lighting systems are typically turned off or dormant in order to conserve energy. Hence, when the user arrives at one of these restricted access floors, several minutes are typically spent turning on the HVAC, lights, and any other number of electrical devices. Some systems require the user to insert their magnetic strip card in a separate reader, such as in the control room for the HVAC (which is typically located on a different floor), in order to initiate equipment operation. This is obviously time consuming and cumbersome.

Lastly, there is often an element of discomfort associated with riding an elevator car, especially when several individuals are present in the car. Due in part to minimal space within the car and nothing to occupy the occupants attention visually, there is a natural tendency for one to stare up, down, or forward at the door of the elevator, or at the visual floor indicators so as to avoid prolonged eye contact with the other occupants.

Heretofore, many of the technologies necessary to address the aforementioned issues have not been available or, alternatively, have been cost or space prohibitive to implement. However, recent advances in data networking, thin or flat panel display technology, personal electronics, and speech recognition and compression algorithms and processing have enhanced the viability of such features from both technological and commercial perspectives.

Based on the foregoing, there is a need for an improved elevator system and method of operation which will reduce the time spent waiting for and travelling on the elevator car, reduce the frustration associated with repeated stops at different floors, and allow the occupants of the elevator (as well as those waiting for the car) to use their time more efficiently and obtain needed information. Additionally, such an elevator system would enhance the security of the occupants upon egress, and allow for automatic recognition of an individual in order to provide access to certain restricted locations and initiation of certain functions such as lighting and HVAC.

SUMMARY OF THE INVENTION

In a first aspect of the invention, computer readable apparatus comprising a storage medium is disclosed. In one embodiment, the storage medium comprises at least one computer program with a plurality of instructions, the at least one program being configured to: receive a first query for first information, the first query relating to a first functional context; retrieve the first information in response to the query, the first information being retrieved from a remote Internet server; cause display of the first information on a display device; cause selection of advertising based on the first context; obtain the selected advertising from a second remote server; and present the selected advertising on the display device contemporaneously with the information.

In a second embodiment, the at least one computer program comprises a plurality of instructions, the at least one program being configured to: receive input from a user via one of a plurality of different function keys associated with a touch-screen input and display device, each of the different function keys having a different context associated therewith; determine a context associated with the one function key; forward the determined context to a remote networked server for the selection of advertising content, the selection being based at least in part on the forwarded context; and present the selected content via the input and display device for viewing by the user.

In a third embodiment, the at least one program is configured to: receive input from a user via a first soft function key associated with a touch-screen input and display device; based at least in part on the input, generate a plurality of different soft function keys on the input and display device, the different soft functions keys each having a different context associated therewith; receive a second input via one of the generated plurality of soft function keys; cause selection of advertising content based at least in part on the context associated with the one generated soft function key associated with the second input; and present the selected advertising content via the input and display device for viewing by the user.

In a fourth embodiment, the at least one program is configured to: receive an input from a user of a transport apparatus, the input relating to a desired function; cause access of a remote server via an associated wireless interface to access information relating to the desired function; receive accessed information via the wireless interface; and implement the desired function using at least a portion of the received information; wherein the storage medium is part of a computerized information system disposed on or within the transport apparatus, the transport apparatus being configured to transport at least one person from one location to another.

In a fifth embodiment, the at least one program is configured to: receive an digitized representation of a speech input from a user of a transport apparatus, the transport apparatus being configured to transport at least one person from one location to another, the input relating to a desired function; cause access of a remote server via an associated wireless interface to access information relating to the desired function; receive accessed information via the wireless interface, the received information being configured specifically for the user based at least in part on data stored on the remote server or an entity in communication therewith, the data being configured specifically for that user based at least in part on one or more previously supplied user-selected configuration parameters; and implement the desired function using at least a portion of the received information, the implementation of the desired function being accomplished at least in part using an output system disposed in the transport apparatus; wherein the storage medium is part of a computerized information system disposed on or within the transport apparatus. The computer readable apparatus is capable of causing search of a remote database of business entities, the database being searchable at least by a name of a business entity; and the speech input is received via a microphone located within the transport apparatus, the speech input comprising the name of the business entity.

BRIEF DESCRIPTION OF THE DRAWINGS

FIG. 6a is a plan view of one embodiment of a network input device having dedicated function keys thereon.

FIGS. 6b and 6c illustrate one embodiment of an exemplary coordinated graphic weather display according to the present invention.

DESCRIPTION OF THE INVENTION

Reference is now made to the drawings listed above, wherein like numerals refer to like parts throughout.

It is noted that while the system and methods of the invention disclosed herein are described primarily with respect to an elevator car, certain aspects of the invention may be useful in other applications, including, without limitation, other types of personnel transport devices such as trams or shuttles or moving walkways, or stationary devices such as kiosks within the lobby or elevator waiting areas of a building. As used herein, the term "building" is meant to encompass any structure, whether above ground or underground, permanent or temporary, used for any function.

General Description

Figure 1:
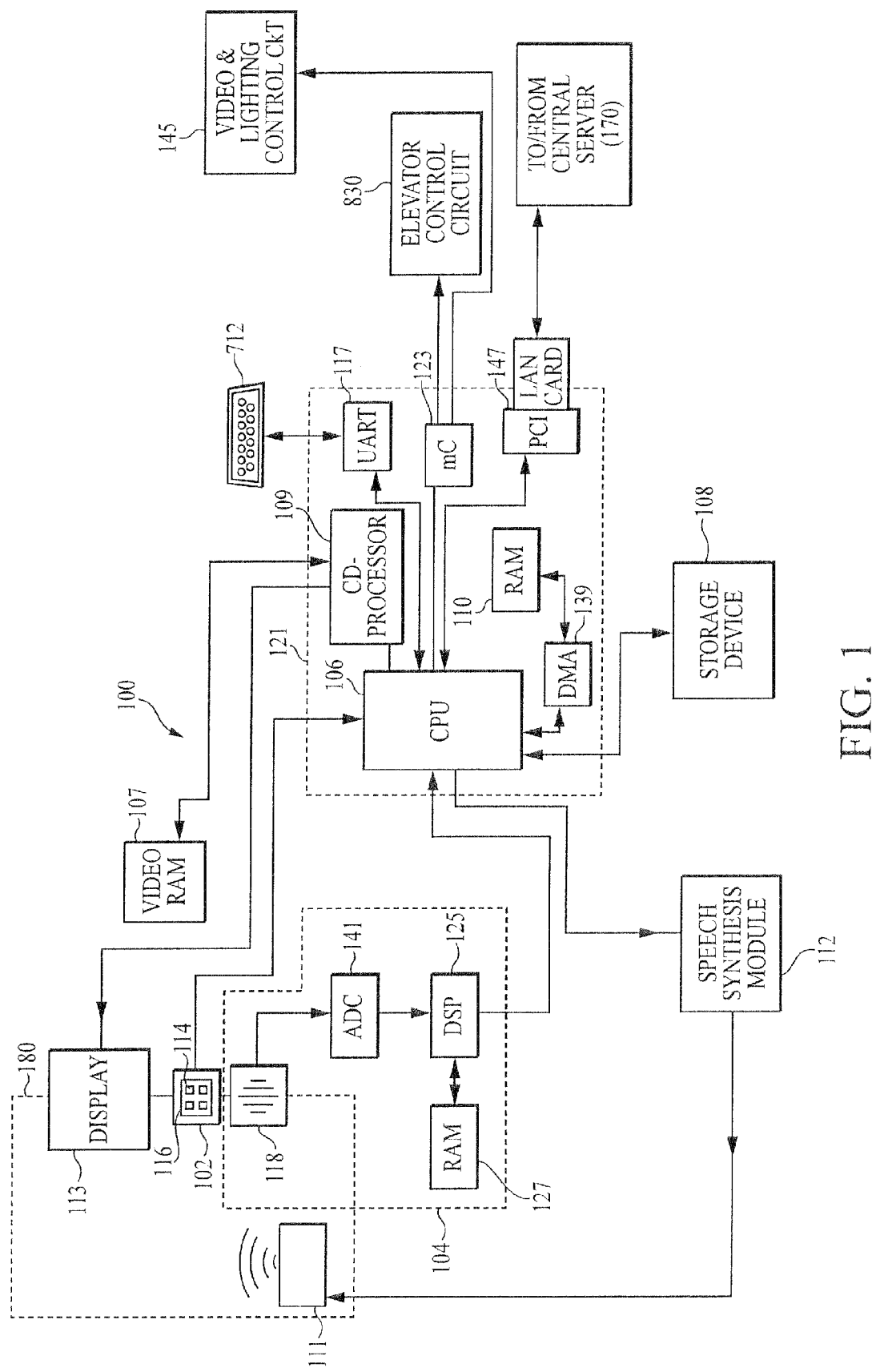
FIG. 1 is a block diagram of one embodiment of the information and control system of the invention, showing those components local to each elevator car.
Figure 2:
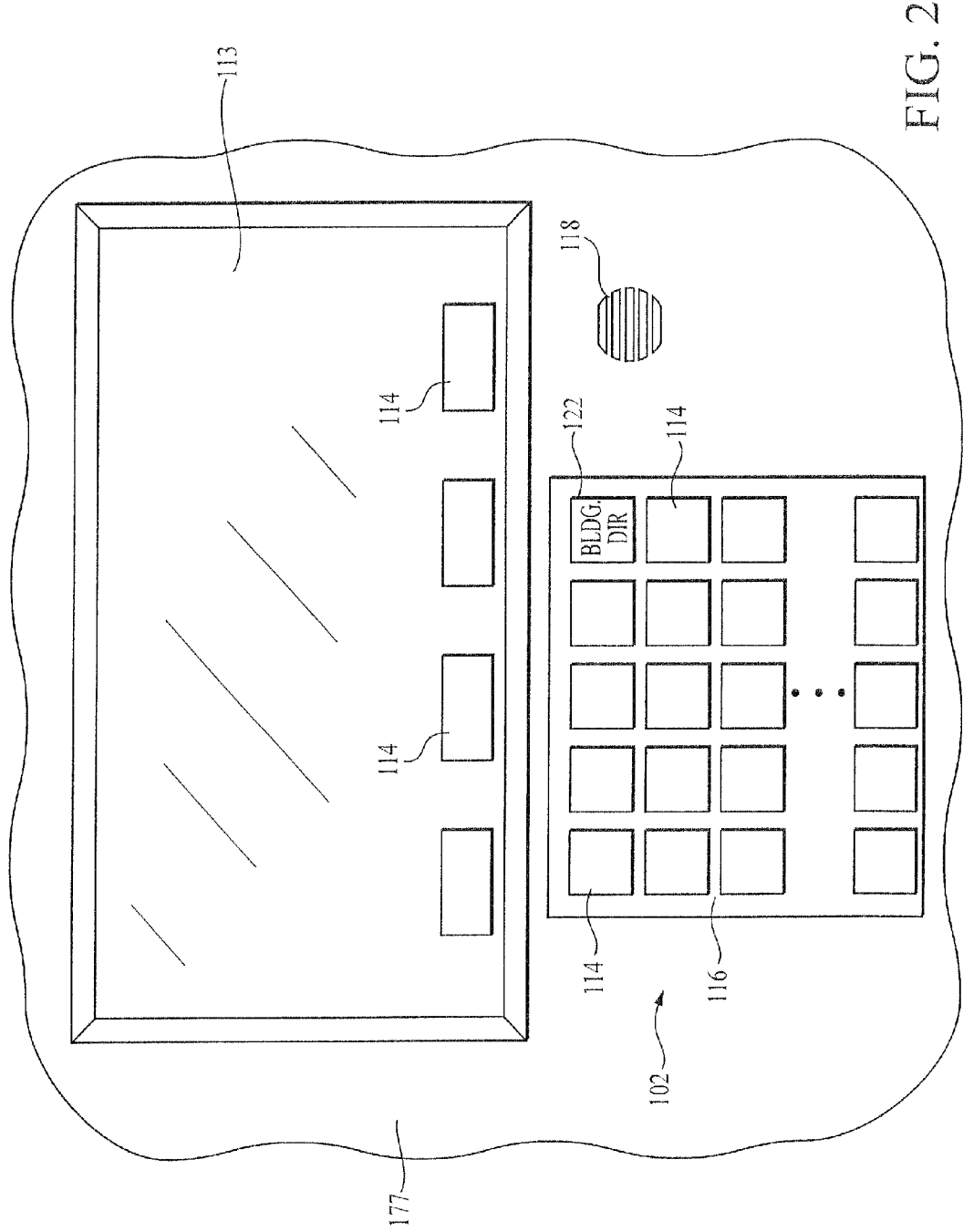
FIG. 2 is a plan view of a first embodiment of the interface panel of the information and control system of FIG. 1, including the touch keypad and the display device.

Referring now to FIGS. 1 and 2, one embodiment of an improved elevator information system is generally described. As shown in FIG. 1, the system 100 includes an input device 102, speech recognition (SR) module 104, central processor 106 with associated motherboard 121, video RAM 107, non-volatile storage device 108 containing a database (not shown), graphics co-processor 109, volatile or dynamic storage device 110 with associated DMA module 139, audio amplifier and speaker module 111, speech synthesis module 112, micro-controller 123, PCI slots 147, and display device 113. The system also includes a serial bus with universal asynchronous receiver transmitter (UART) 117 or alternatively universal serial bus (USB), as described in greater detail below with respect to FIG. 7. As shown in FIG. 2, the input device 102 of the present embodiment is a touch-sensitive keypad and/or display screen of the type well known in the electrical arts. The input device 102 includes a variety of different functional keys 114 on a keypad 116 (and/or on a touch-sensitive display screen 113, as described below) which allow the user to initiate a query of the database either manually via the keypad 116, display device 113, or audibly through the speech recognition module 104.

As shown in FIG. 1, the speech recognition module 104 of the present invention includes a high quality, high SNR audio microphone 118, analog-to-digital converter (ADC) 141, and linear predictive coding (LPC)-based spectral analysis algorithm run on a digital signal processor 125 having associated SR module RAM 127. It will be recognized that other forms of spectral analysis, such as MFCC (Mel Frequency Cepstral Coefficients) or cochlea modeling, may be used. Phoneme/word recognition in the present embodiment is based on HMM (hidden Markov modeling), although other processes such as, without limitation, DTW (Dynamic Time Warping) or NNs (Neural Networks) may be used. Myriad speech recognition systems and algorithms are available, all considered within the scope of the invention disclosed herein.

In the present embodiment, CELP-based voice data compression is also utilized for transmission and storage of voice data. CELP algorithms in general are useful for converting analog speech to a compressed digital format which is more rapidly and easily manipulated and stored within a digital system using less bandwidth and memory. CELP algorithms and low bit rate vocoder technology are well known in the signal processing art, and accordingly will not be described further herein. Note that as used herein, the term CELP is meant to include any and all variants of the CELP family such as, but not limited to, ACELP, VCELP, and QCELP. It is also noted that while CELP is used as the basis of compression within the system 100, other types of compression algorithms and techniques, whether based on companding or otherwise, may be used. For example, PCM (pulse code modulation) or ADPCM (adaptive delta PCM) may be employed, as may other forms of linear predictive coding (LPC).

As illustrated in FIG. 1, signals generated by the microphone 118 are digitized by the ADC 141 and processed using the aforementioned speech recognition algorithm and the DSP 125 to produce digital representations of the user's speech. The speech library or dictionary stored within the SR module memory 127 is used by the DSP 125 to match phenome strings resulting from the LPC analysis with known words. Once a "match" is identified, the central processor 106 and/or micro-controller 123 implement the desired functionality, such as retrieving one or more data files from the storage device 108 for display on the display device 113.

The DSP 125 of the present embodiment is a Texas Instruments TMS320C6x VLIW digital signal processor or equivalent, although it will be recognized that other types of processors may be used. The 'C6x DSP is chosen for its speed and capability, thereby allowing for real-time speech recognition. The central processor 106 and associated motherboard architecture (e.g., northbridge, southbridge, etc.) is optimally an Intel Pentium II®-based design, although others, such as the AMD K600-series processors, may be used in place of the Pentium II®. The aforementioned USB is also advantageously used with the Pentium architecture.

The information and control system keypads 116 and displays 113 (FIG. 2) are placed at waist and eye level, respectively, within the elevator car 180 to facilitate easy access and viewing by the user, and limit the amount of incidental contact by passengers in the elevator. A plurality of different input/display devices are optimally disposed within the smart elevator to allow multiple occupants to obtain information simultaneously. A capacitive "touch keypad" is used as the input device 102 in the present embodiment to increase input device longevity and thwart vandalism. Specifically, since the function keys 114 on the keypad 116 do not have a mechanical actuating device (such as a spring and set of electrical contacts) which will wear with time, they will as a general rule last longer. Additionally, since the keypad 116 has no openings in the vicinity of the individual keys, any incidental contact with deleterious substances such as cleaning fluids will not affect the operation of the system or degrade its longevity. Similarly, vandalism is discouraged, since there are no openings or other access points present within the interior of the elevator car. The keypad 116 may also be covered with a protective coating of the type well known in the art without affecting the operation of the panel, since, if properly chosen, such a coating merely acts as a dielectric for the capacitor formed between the underlying contacts and the user. It will be recognized, however, that any number of input devices, including "mechanical" keypads, trackballs, light pens, pressure sensitive "touch" keypads, or the like may be used in conjunction with the present invention if so desired. The touch keypads 116 are, in the present embodiment, mounted flush with the vertical wall surfaces 177 of the elevator car so as to make them as physically unobtrusive as possible.

The touch-screen display 113 generates a variety of different messages or display formats based on the user's input and query. These messages and formats are stored as digital data on the storage device 108 (and temporarily in video RAM 107) which is accessed by the processor 106. The display devices 113 of the present embodiment are low profile capacitive LCD touch screen devices of the type well known in the art, although other types of displays, including "flat" cathode ray tubes, plasma, or TFT displays may be used. Such displays optimally limit the amount of space required external to the interior volume of the elevator car to accommodate the system 100 of the present invention. Furthermore, it is noted that a non-touch sensitive display (not shown) may be used with the aforementioned input device 102 if desired, the latter acting as the sole input device (other than the speech recognition module 104 and associated microphone 118).

In the embodiment of FIGS. 1-2, the processor 106, video RAM 107, storage devices 108, 110, and other components (including necessary power supplies, not shown) are disposed within equipment storage housings (not shown) located on the exterior of the elevator car 180 so as to be invisible to the occupants thereof. This arrangement is used primarily to allow rapid access to and processing of data by the system 100, thereby facilitating the rapid delivery of information to the system user. Hence, the information and control system 100 of each elevator car is to a degree "self contained", with the exception of several common functions performed by a central server 170.

Figure 3:
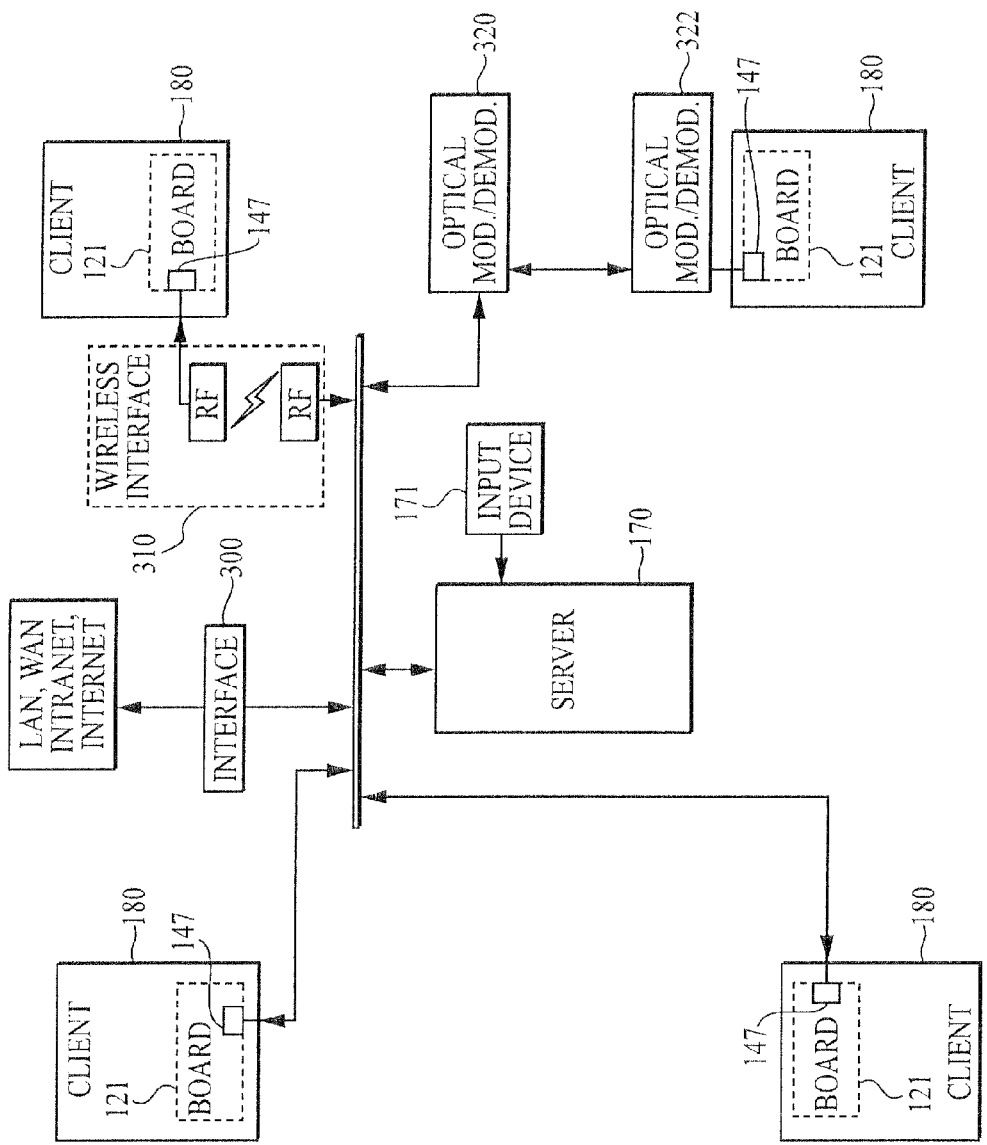
FIG. 3 is a block diagram of one embodiment of the information and control system network architecture.

As shown in FIG. 3, the central server 170 is located remotely from the elevator cars and connected to the elevator car "clients" 180 via a local area network architecture such as a bus, star, ring, star/bus, or other similar topology. A bus topology is shown in FIG. 3. The network may operate according to any number of networking protocols including, for example, ATM, Ethernet, Gigabit Ethernet, IP, IP over ATM, or X.25. Connection cabling from the peripheral component interconnect (PCI) slots 147 on each motherboard 121 carrying the network interface devices (such as a LAN card) is run alongside the existing elevator power and control cables within the cable bundle servicing each car.

In an alternative embodiment, data may be transferred between the elevator cars 180 and the remote server 170 via a wireless interface 310 (FIG. 3) such as a direct sequence spread spectrum (DSSS) or frequency hopping spread spectrum (FHSS) system as specified by IEEE Standard 802.11. It will be recognized, however, that any wireless interface capable of accommodating the bandwidth requirements of the system 100 may be used. Optical networking architectures and protocols (such as SONET) may also be used if desired; optical modulators and demodulators 320, 322 of the type well known in the data networking arts are employed for transferring data between the server 170 and the client(s) 180 in such architectures.

It will be appreciated that many different arrangements for the disposition of various components within the system, including, inter alia, the processor/motherboard, storage devices, server, and memory (and the transfer of data and signals there between) are possible, all of which are encompassed within the scope of the present invention.

Building Directory Sub-System

Figure 4:
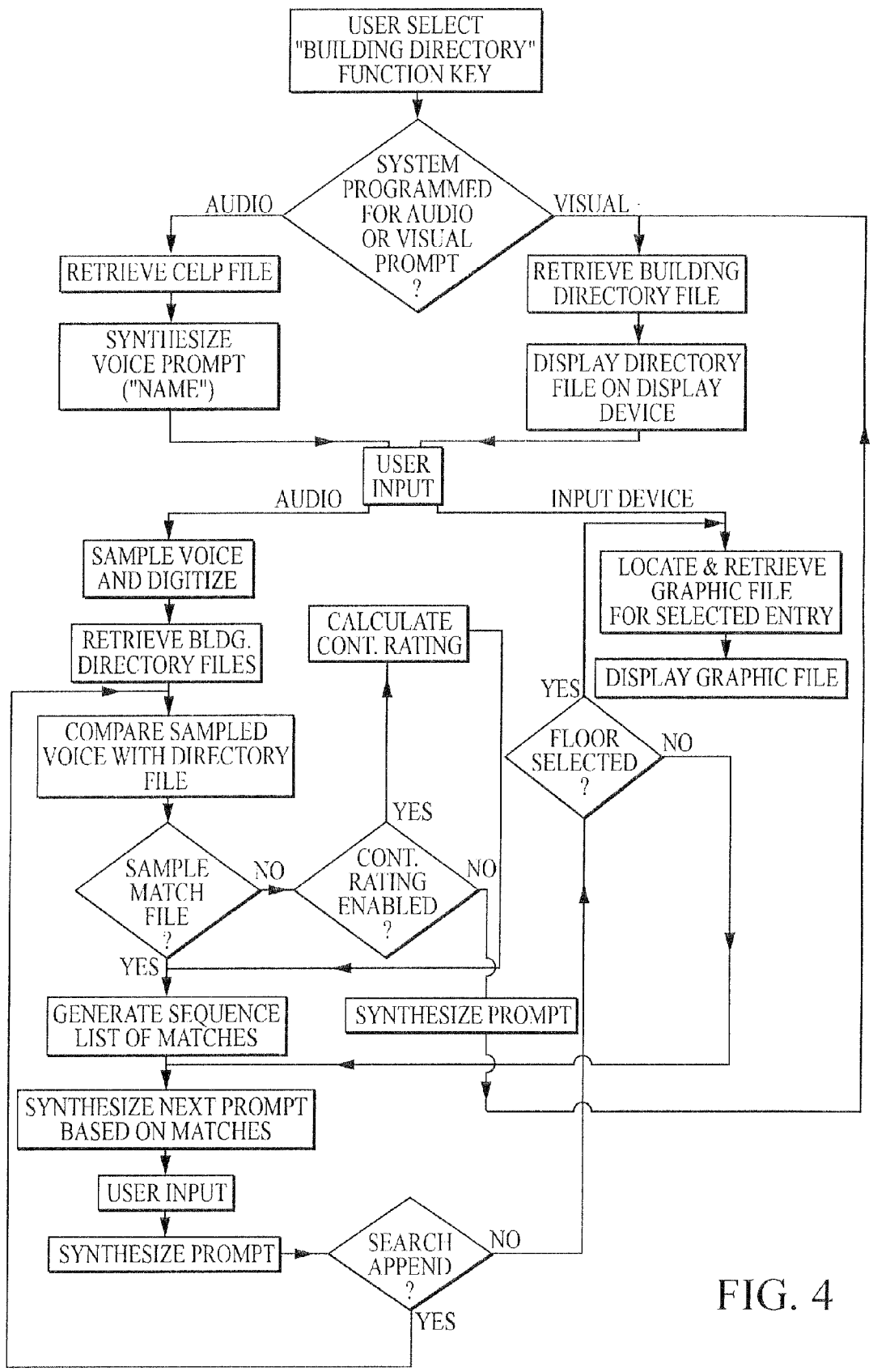
FIG. 4 is a logic diagram illustrating the operation of one embodiment of the building directory sub-system of the invention.

The operation of the building directory sub-system is now described in greater detail with reference to the logic diagram of FIG. 4, and the components of FIGS. 1-3. As used herein, the term "building directory sub-system" refers to that collection of components, firmware, and software within the information and control system 100 of FIG. 1 which perform the building directory functions as described in the following paragraphs.

Upon entering the elevator, the user initiates the "Building Directory" function of the system by pressing a function key 122 on the keypad 116 or touch display 113. The keypad 116 and/or key 122 may be labeled with an appropriate label such as "Building Directory" or the like. Upon depressing the function key 122, a signal is generated which prompts the system to respond with an audible and/or visual query to the user, depending on how the system is pre-configured. For an audible query, the sub-system of the present embodiment retrieves a pre-stored CELP (or other compressed format) data file from one of the storage devices 108, 110 and converts that file to an analog audio representation of voice via the speech synthesis module 112 and processor 106. Speech synthesis technology is well known in the signal processing arts, and accordingly will not be discussed further herein. The audio signal from the synthesis module 112 is applied to the amplifier and audio speaker 111 to generate a voice prompt, such as "Name?". Alternatively, or simultaneously if desired, the system 100 retrieves a separate data file from the storage device 108, 110 which represents the current building directory. The building directory data file contains a plurality of entries relating to tenants in the building where the system 100 is located. Each entry is parsed into data fields which contain, inter alia, the firm or entity name, its location (such as floor and suite number), and a list of the first and last names of all persons employed there. The processor 106 (and associated graphics co-processor 109 with video RAM 107) initiate the display of all retrieved data entries in the directory file on the display device 113 in a convenient format, such as an alphabetical list from which the user can select their desired option. The user may then speak the specific name of the party they wish to find, or select the name using the touch display 113 or other input device (such as a track ball; not shown). When the user speaks the name of the party desired, the speech recognition module 104 takes the analog signal from the microphone 118 and converts it to a digital format by way of the DSP 125 and compression algorithm, as previously described. The directory file is retrieved (if not already done), and the digitized and coded speech compared to the contents of the directory file to find any matches. Any matching fields within the entries of the data file are provided to the user, either audibly via the speech synthesis module 112 and speaker 111 using prompts, or visually via the display 113. In the present embodiment, audible prompts for a single matching entry are of the form: "[Name], [Company], located at Suite X on Floor Y". For multiple matching entries, the audible prompts are produced in a sequential, predetermined order (such as the numerical sequence number of the entries within the directory file). For example, the first matching entry (alphabetically) would be synthesized in the foregoing form, followed by the second entry, etc. Upon hearing the desired match in this voice activated embodiment, the user simply states "Stop", to choose the entry desired. At this point, a separate audio prompt is generated (such as "Select (floor number) Floor?") which prompts the user to either select the floor number associated with the matched directory item and terminate their session (such as by stating "yes"), or continue on with the next entry (such as by stating "no") until all entries are exhausted. The directory sub-system is programmed to store in memory 110 and "remember" previous files retrieved within a given user's session so as to not repeat the same selections during that same session. For example, if there are five "Smith" entries in the directory file, and the user enters the query "Smith", the sub-system will select a different "Smith" entry on each subsequent user query during the same session until the correct Smith is located or all matching entries have been exhausted. In the present embodiment, a session is defined as the time period between two successive selections of the "Building Directory" function key 122, or the expiration of a predetermined period of time without a user input after selection of that function. The sub-system is also optionally programmed to allow the user to append defining information to the initial query statement to form a Boolean search statement. For example, if the first "Smith" selected by the sub-system is not the desired one, the user may then append the query by saying "ABC Corporation" or "John" in response to the next "Select (floor number) Floor?" query by the sub-system. The sub-system will then recognize the new entry, and search all fields in all "Smith" entries to locate those listings having both the name "Smith" and "ABC Corporation" (or "John"), using Boolean "AND" logic. The user will then be prompted again to "Select (floor number) Floor?". If no matching entries are found, the sub-system will either notify the user to this effect, such as using an audio message such as "No matches found", or will display or announce the nearest approximation of the query based on a confidence rating. The confidence rating is calculated, for example, by the processor 106 running an algorithm; such confidence rating calculation algorithms are well understood, and indicate the quality of the match using a numeric value or index.

As used herein, the term "match" includes any predetermined criteria for correlating one piece of data to another. For example, the building directory sub-system may be programmed to consider two pieces of data a "match" when all bits with the exception of the least significant bit (LSB) are identical. Many such criteria are possible, and all are considered to be within the scope of the invention disclosed herein. Furthermore, partial matches, such as when the user enters one word which is matched within several different entries of the directory file, may be used as the basis for an appended search, as described below.

Figure 5:
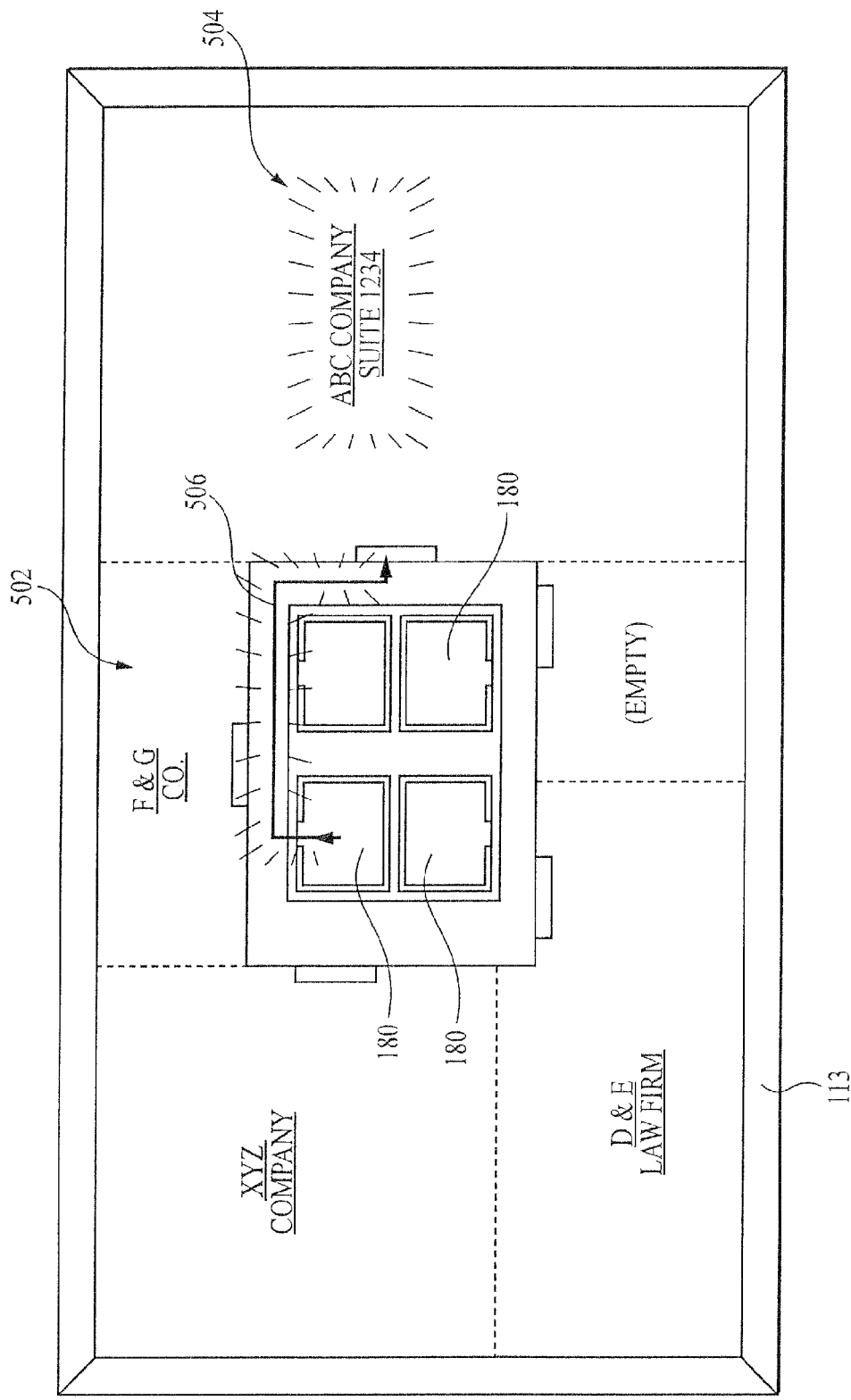
FIG. 5 is a plan view of one embodiment of a building directory sub-system graphic location file, as shown on the display device of the information and control system.

The directory file described above also optionally has a location graphic data file appended or linked thereto, which is retrieved from the storage device 108, 110 or the server 170. The location graphic file is displayed on the display device 113 as a floor map graphic 502 illustrating the location of the selected person or firm 504 on that floor in relation to the elevator cars 180, as illustrated in FIG. 5. For example, the location of the individual or firm being sought is illuminated or colored, made to flash, and/or an illuminated arrow 506 is made to point to the desired location from the elevator. Numerous different and well understood visual and audible formats for providing the user with the desired information may be used with equal success, all of which are considered within the scope of the present invention.

The directory system 200 of the present embodiment also optionally includes directory files for nearby office buildings or establishments, thereby alerting the user through visual or audible prompt that they are in the wrong location once a match is confirmed by the user.

The user's session is terminated, or a new query initiated, when the "Building Directory" function key 122 is again depressed, after a predetermined time period without a user input, or upon the occurrence of some other event as desired.

Network Interface

Figure 6C:
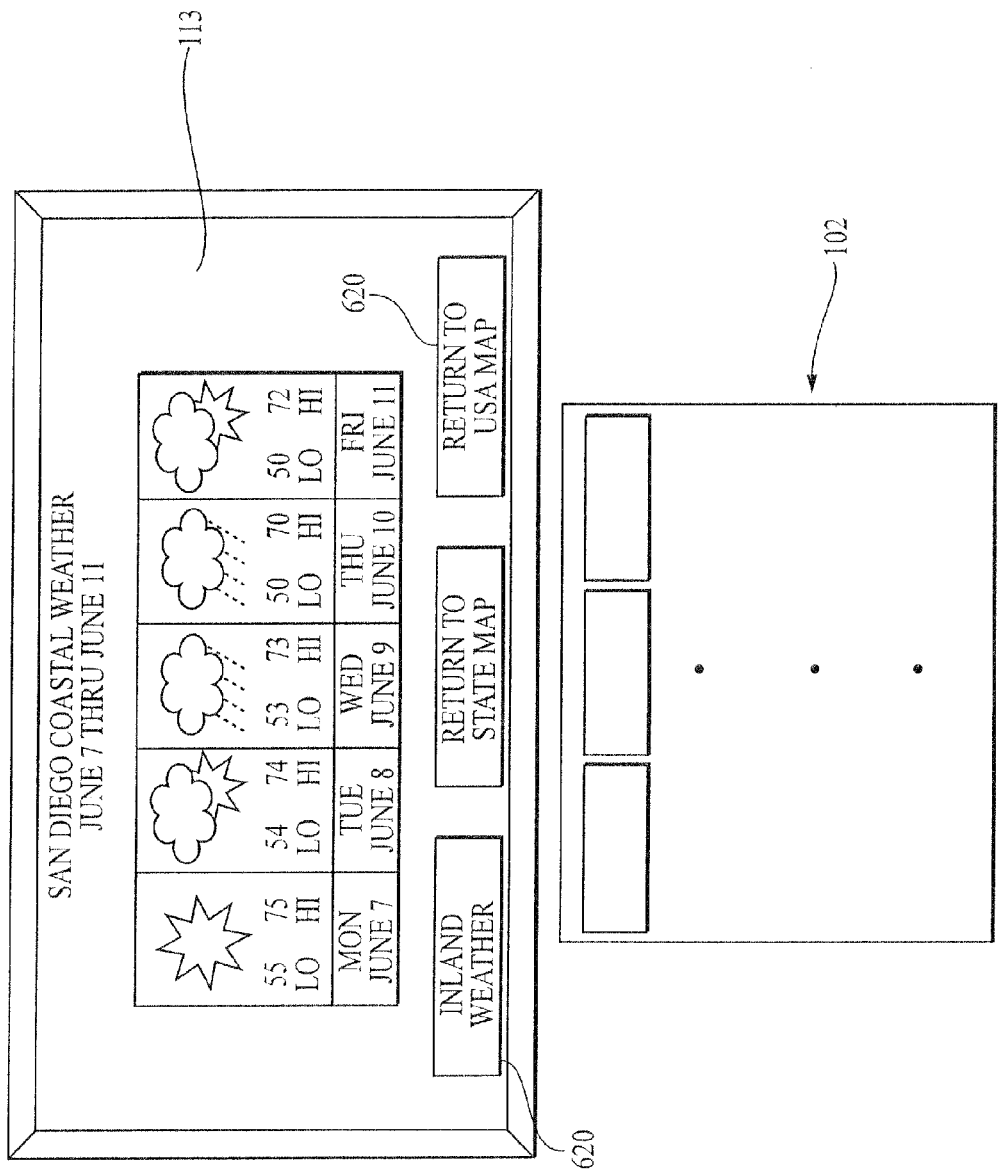

The information system 100 described above may also include other functional aspects. As illustrated in FIG. 3, one embodiment of the system includes a network interface 300 (such an internet or intranet data link) which permits the user to rapidly access updated information on a variety of predetermined topics of interest. For example, the input device 102 and/or display 113 of FIG. 2 is configured to include dedicated function keys 602 correlating to Internet hypertext markup language (HTML)-based hyperlinks, the hyperlinks corresponding to URLs (universal resource locators) for news headlines, weather, sports scores, financial data, directions to local airports or public transportation, etc, as shown in FIG. 6a. Alternatively, the function keys 602 provide the user access to addresses within a local or remote server 170 via a LAN or intranet, which has the desired information stored thereon. The function keys may also be integrated with the touch display 113 (and the components previously described with reference to FIGS. 1 and 2 above) to allow the user to interact with the system 100 via both the input device 102 and "soft" function keys on the touch display 113. For example, if the "Weather" function key 604 is selected, the display would retrieve and generate an HTML page with representation of a map of the United States with hyperlinks for each state (FIG. 6b). Once a state or geographical area was selected by the user via the hyperlinked "soft" keys 620 on the touch display 113, the user would be presented with the desired weather information on the display, such as the current weather conditions and five-day forecast in a mixed textual/graphic format such as that of FIG. 6c. Preset function keys and graphic representations with icons are used in the present embodiment to facilitate rapid access and display to a more narrowly tailored collection of data, since most users will have only seconds to locate, interpret, and remember the desired information. The generation of textual, graphic or mixed media displays based on HTML or other languages or formats is well known in the computer arts, and accordingly will not be described further herein.

The information and control system 100 may also be programmed to provide information via the display unit(s) 113 on a rotating basis without the need for user intervention. For example, a given display unit 113 may be programmed to display a summary of local weather for the next five days (such as that shown in FIG. 6c) for a first period of time, followed by a brief summary of breaking headlines for a second period, followed by financial highlights for a third period, and so forth. The update rate (i.e., the time between changing of the displays) should be adjusted so as to permit for adequate recognition and use by the occupants. An update rate of approximately 10-15 sec. should be sufficient for most topics and applications, although this period may be varied as needed.

Referring again to FIG. 3, connection of the information and control system 100 to external LANs, WANs, intranets, or internets (e.g., the Internet) is accomplished via the network interface 300. In one embodiment, this interface 300 comprises a so-called "cable modem" of the type well known in the networking arts. Such cable modems effectively overlay IP data on a coaxial cable which is also used to supply analog video data to the end user. In the case of an elevator system, cabling between the system server 170 and each car 180 may be run in parallel with the existing electrical services cable bundle, or alternatively a wireless interface (such as the aforementioned DSSS or FHSS transceiver 310) employed to transmit data between the cars and the server 170. Many configurations for transmitting data between the cars and the system server 170 may be used. Alternatively, a dedicated integrated services data network (ISDN) line may be used to by the server 170 to access external networks such as the Internet. Furthermore, it is feasible to utilize a wireless link as the network interface 300 between the server 170 and the LAN, intranet, or internet 307.

Information Download to PED

Figure 7:
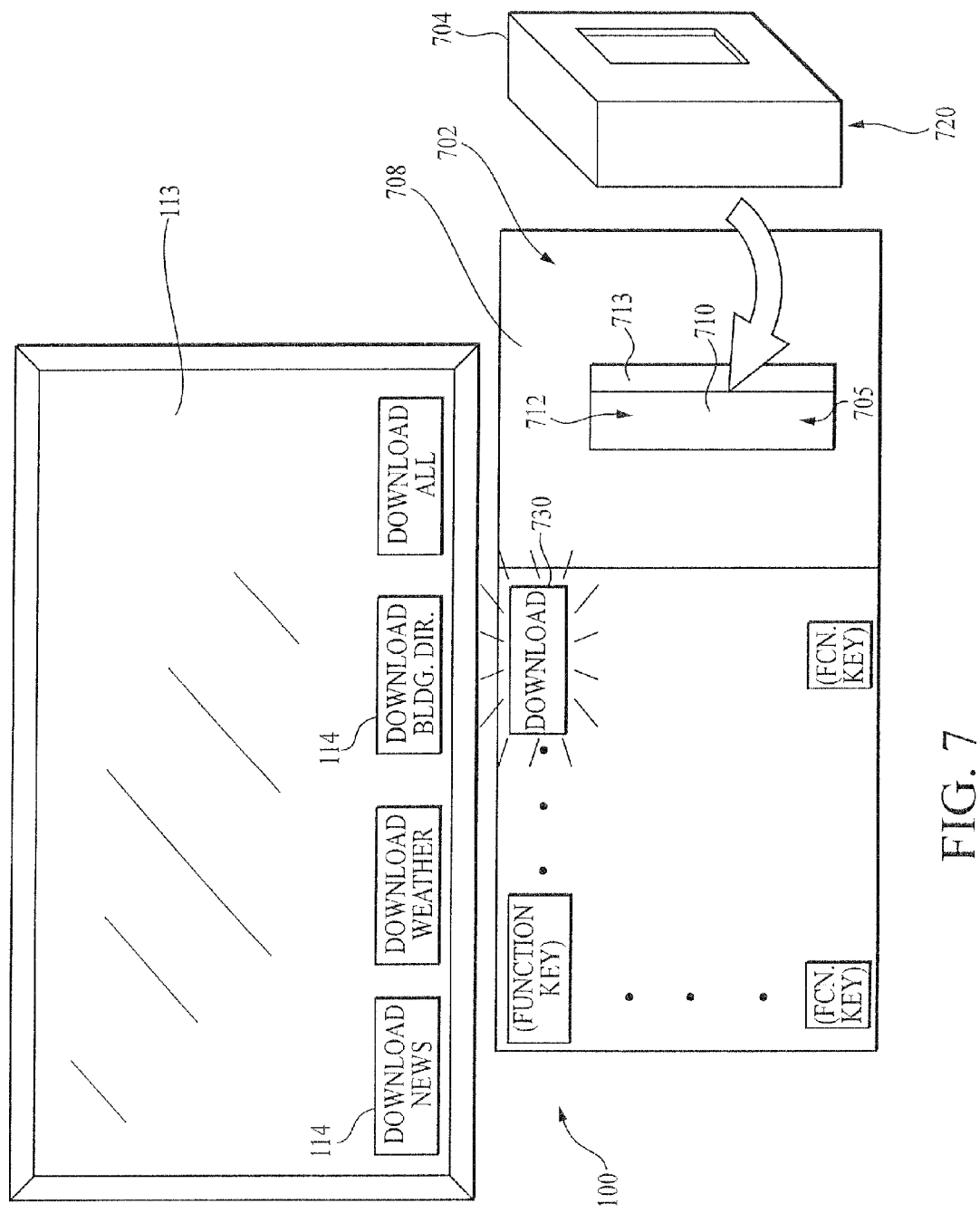
FIG. 7 is a plan view of one embodiment of the PED data download terminal of the invention.

Referring now to FIG. 7, another embodiment of the information and control system 100 of the present invention is described. In this embodiment, the system 100 is additionally provided with one or more data terminals 702 which allow the user to plug a personal electronic device (PED) 704 having a standardized interface into the system to obtain a "download" of information. As used herein, the term "PED" includes, but is not limited to, personal digital assistants (PDAs) such as the Apple Newton®, US Robotics/3COM PalmPilot®, or Palm III®, laptop computer, notebook computer, or the like. The data terminal includes a connector 712 which is a 9-pin RS-232 serial connection of the type well known in the electronic arts, although other types of connectors and protocols may be used. The download between the system 100 and the PED 704 may be automatically initiated by plugging the PED 704 into the data terminal 702 and thereby mating the connector 720 of the PED 704 with the connector 712 of the data terminal 702, or manually initiated by the user via the input device 102, touch display 113, or the PED 704 software. The data terminal 702 is connected to the serial bus and processor 106 of the system 100 as shown in FIG. 1, whereby the processor 106 retrieves data stored on the storage device 108, 110, or alternatively downloads data from an external source via the network interface 300. A universal asynchronous receiver/transmitter (UART) 117 or universal serial bus (USB; not shown) of the type well known in the computer arts is used to electrically interface the processor 106 of the system 100 and the PED 704.

As shown in FIG. 7, the PED 704 is received within a conformal slot 706 formed in the display panel 708, thereby automatically aligning the data connector 720 of the PED 704 to that of the system 100. The slot 706 includes a spring-loaded cover 713, and is sealed against any introduction of deleterious fluids or other material, and the terminal pins 710 of the connector 712 are recessed so as to avoid incidental damage. Once the download is complete, the user simply removes the PED from the slot. Based on the volume of data downloaded, the entire transaction takes only a few seconds. Application software resident on the PED 704 is adapted to receive the downloaded data, store it within the storage device of the PED (not shown), and display it at a later time. In one embodiment, the downloaded information comprises an electronic "newspaper" having information relevant and useful to the user, such as national/local news, weather, sports, and the like. Other types of information, such as the building directory, firm resumes, local telephone directory, maps of the local area, and such may be downloaded as well. In another embodiment, the user may select the type of information downloaded using a menu of function keys 114 on the panel keypad 116 or touch screen display 113. For example, the user first selects the "Download" function key, which then activates a menu on the touch display 113 which allows him/her to select from a number of pre-determined types of information using either dedicated function keys or alternatively functions shown on the touch screen display 113. In yet another embodiment, the configuration of the data downloaded via the terminal 702 is determined based on data received from the RFID tag of the user, as described in greater detail below with respect to FIG. 15. In this fashion, the user may automatically receive information "tailored" to his/her needs.

Capacity Sensing Sub-System

Figure 8:
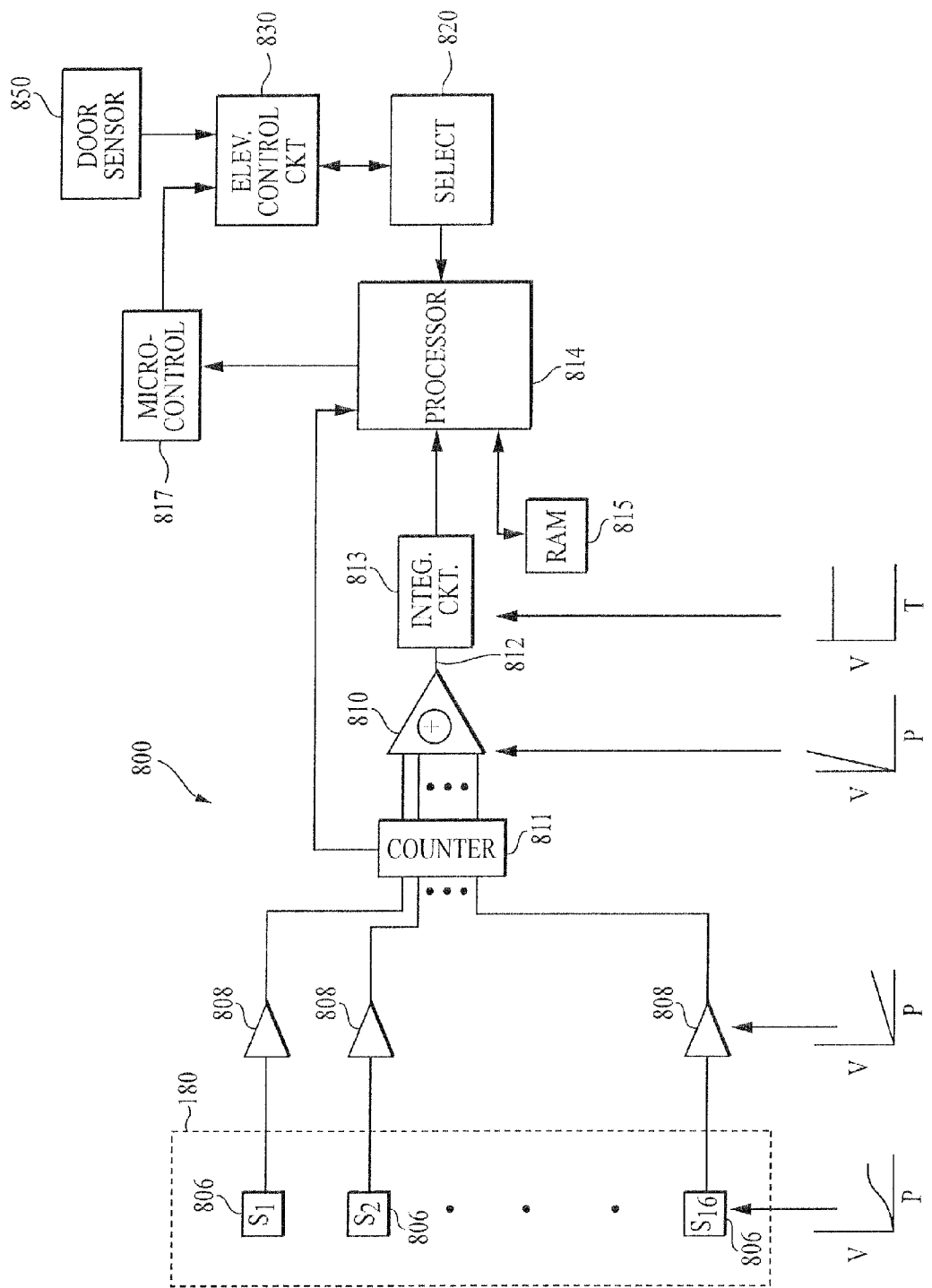
FIG. 8 is a block diagram of one embodiment of the capacity sensing sub-system according to the present invention.

Referring now to FIG. 8, the elevator system of the present invention further optionally includes a capacity sensing sub-system 800 which detects the loading of the elevator car and selectively bypasses floors when the capacity is met, unless the floor is selected by one of the occupants of the car. In the embodiment of FIG. 8, the flooring 804 of the elevator car 180 is equipped with a plurality of piezoelectric sensors 806 which generate electrical signals based on the pressure (and force) applied to them. Such sensors are well known in the electrical arts, and it will be recognized that other types of sensors and sensing arrangements may be used. The sensors 806 are calibrated or nulled for the weight of the elevator flooring 804 and any pre-load resulting therefrom. The electrical signal produced by each of the sensors 806 is amplified and made linear by a first stage amplifier 808 and fed to a summing amplifier 810 which sums the values for all of the sensors 806 to produce a composite signal 812 proportional to the summed signals of all the sensors. The composite signal 812 is integrated or averaged over the entire time travelling between floors by an integrator circuit 813 (or alternatively, an algorithm running on the processor 814), thereby accounting for any apparent increase in weight due to acceleration in the upward direction or deceleration in the downward direction, or apparent decrease in weight due to deceleration in the upward direction or acceleration in the downward direction. Linearization of the output of each sensor 806 is required when the voltage output of the sensor is not linear with respect to pressure; this allows the linear signals to be summed directly within the summing amplifier 810, the output of which 812 is linear in voltage with respect to pressure.

The composite signal 812 from the integrator 813 is correlated using the processor 814 to a known weight using a proportionality or scaling constant stored in memory 815, and ultimately to a first estimate of the number of occupants within the car _ by way of another scaling constant also stored in memory 815. For example, if a total pressure reading equating to 1500 lbs. (after null calibration) was obtained from the summing amplifier 810, it could be correlated to an occupancy of ten persons, assuming that the average person weighs 150 lbs. and that their distribution within the car was uniform.

Figure 9:
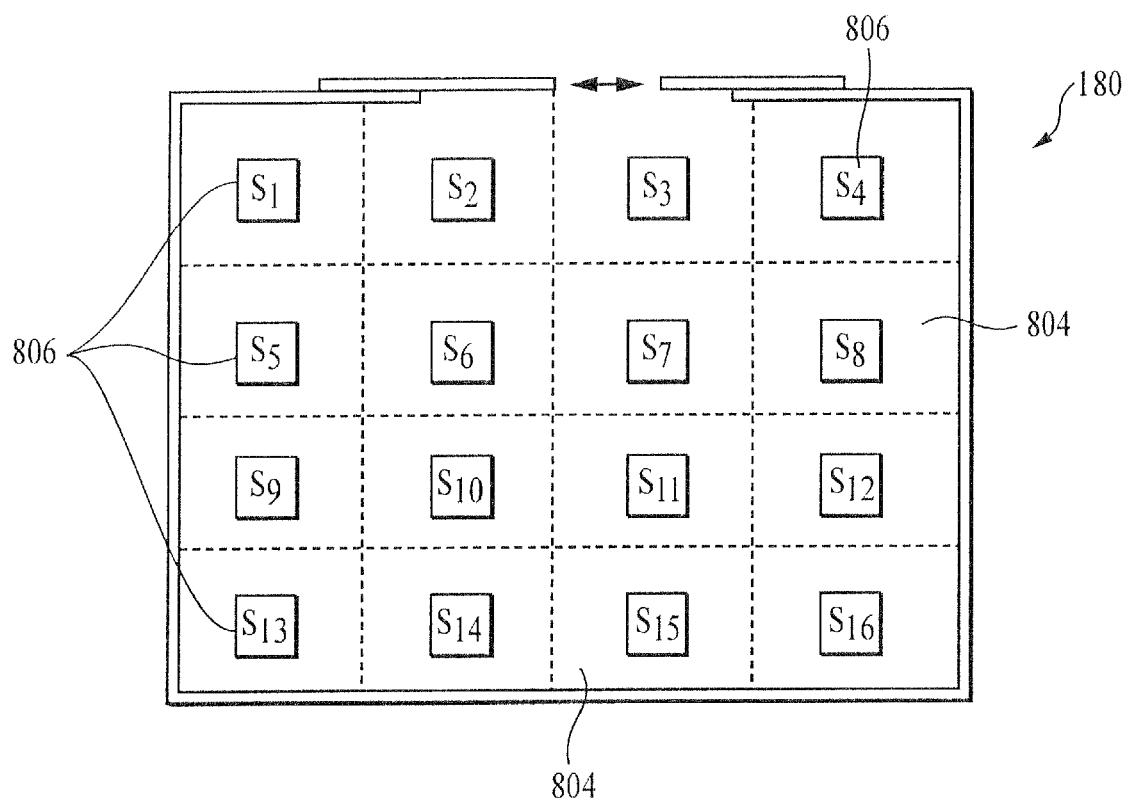
FIG. 9 is a plan view of one embodiment of the elevator floor sensor array used in conjunction with the capacity sensing sub-system of FIG. 8.

However, such "average" cases of weight and distribution thereof within the car 180 do not always occur, since often times people riding in the car may have significant disparities in size and weight, or may be transporting heavy objects. Furthermore, weights which are not an integer multiple of the scaling constant present the system with an ambiguity that must be resolved; i.e., how to round fractional amounts of a person. Accordingly, to address these situations, the first embodiment of the sub-system 800 of the present invention compares the foregoing first occupancy estimate to the number of different sensors 806 supplying a non-zero signal to the summing amplifier 810 as measured by a counter circuit 811. The number of sensors 806 supplying a non-zero signal is used as a lower limit on the occupancy estimate. Additionally, the number and disposition of sensors 806 within the car 180 are chosen to provide the sub-system 800 with information regarding the distribution of weight therein. For example, the elevator car 180 of the present embodiment is equipped with sixteen sensors positioned in a 4×4 array of four rows and four columns, each sensor 806 being centered within its fractional ($1/16^{th}$) area of the flooring, as shown in FIG. 9. Assume that the weight of 1500 lbs. is distributed within this car of FIG. 9 such that sensors "1" and "2" produce signals proportional to 100 lbs. each, sensors "10" and "11" produce signals proportional to 110 and 40 lbs. respectively, and sensors "13" and "14" produce signals proportional to 150 lbs. each. Hence, the total weight present in the car is 650 lbs. Assuming a scaling constant of 150 lbs. per person, a first occupancy estimate ($O_E$) of 4.33 persons is produced. Since six different sensors 806 are producing non-zero signals, with four of the six (i.e., "1", "2", "13", and "14") producing signals equal to those of at least one adjacent sensor. As used herein, two sensors are adjacent when they are within one row and one column of each other. The remaining two of the six sensors in this example (i.e., "10" and "11") are producing signals different from those of adjacent sensors. Looking purely at the number of sensors producing non-zero signals (six), there could theoretically be as many as six different entities within the car, assuming that no entity can take up less than $\frac{1}{16}^{th}$ of the available floor space within the car. Specifically, two 100 lb. people could be standing next to one another atop sensors "1" and "2", a 110 lb. and 40 lb. person atop sensors "10" and "11", respectively, and two 150 lb. people atop sensors "13" and "14". This number is the uncorrected occupancy maximum value, $O_{maxu}$. Alternatively, however, it may be concluded that as few as three people could be in the car, based on the assumption that a person may occupy up to and including two adjacent sensors (i.e., no more than $\frac{2}{16}$ths or $\frac{1}{8}$th of the floor space in the car). For example, a 200 lb. person could be standing atop sensors "1" and "2", with their weight equally distributed. Similarly, a 150 lb. person could be standing atop sensors "10" and "11", with weight shifted mostly onto sensor "10". The third (300 lb.) person could be atop sensors "13" and "14", with weight equally distributed. This latter value is the occupancy minimum based sensor data, $O_{mins}$. Note that for purposes of calculating $O_{mins}$, each sensor is only counted once.

Hence based on the foregoing, the sub-system 800 would need to resolve the ambiguity between (i) the first estimate calculated based purely on weight and a predetermined scalar quantity; (ii) the maximum theoretical number of occupants based on weight sensor data; and (iii) the minimum theoretical number of occupants based on weight sensor data. To resolve this ambiguity, the sub-system 800 of the present embodiment imposes the restriction that any entity atop a sensor producing a signal proportional to less than an arbitrary lower threshold (say, 50 lbs. in the present example) which is adjacent to another sensor producing a non-zero signal is part of the same entity atop that adjacent sensor. In the foregoing example, sensor "11" registers only 40 lbs. of weight, and is adjacent to both sensors "10" and "14", which have non-zero output. Hence, the signal output from sensor "11" is assumed to be part of the same entity which is atop sensors "10" or "14". Since no other sensors in the foregoing example registered less than the assumed threshold of 50 lbs., all other sensors are presumed to have a distinct entity atop them. Hence, the corrected maximum number of entities calculated by the system ($O_{maxc}$) is reduced from 6 to 5. Note that once a sensor having a weight value less than the threshold is "paired" with another adjacent sensor, that adjacent sensor can not be paired with any others, thereby preventing double-counting. This restriction also addresses the instance where the measured weight on a given sensor of interest is above the lower threshold value, yet is due to two entities each located on adjacent sensors as well as the sensor of interest.

To further assist in resolving occupancy estimate ambiguity, the foregoing information is also correlated with the number of different floors selected within the elevator on the selection panel 820. Specifically, the number of different floors selected on the elevator car selection panel are used as a second lower limit or occupancy minimum, $O_{minp}$. Using the preceding example, if the sub-system 800 detects that five different floors were selected, the system would recognize the presence of five persons, one corresponding to each different floor selected. It is assumed that the instance wherein one person selects multiple floors (such as through inadvertent or mistaken floor selection) would occur infrequently, and would also not be of any significance since the number of people actually on the elevator in such instances would always be less than the estimate derived by the system, thereby affording more space within the car than estimated. In the converse situation, for example when the first occupancy estimate or maximum estimate indicate the presence of several different persons, yet the number of different floors selected is fewer, the system does not set the fewer number of floors equal to the number of occupants, since the additional weight is likely represented by additional passengers getting off at the same floor(s), or few passengers having cargo or other weighty objects with them in the elevator.

Figure 10:
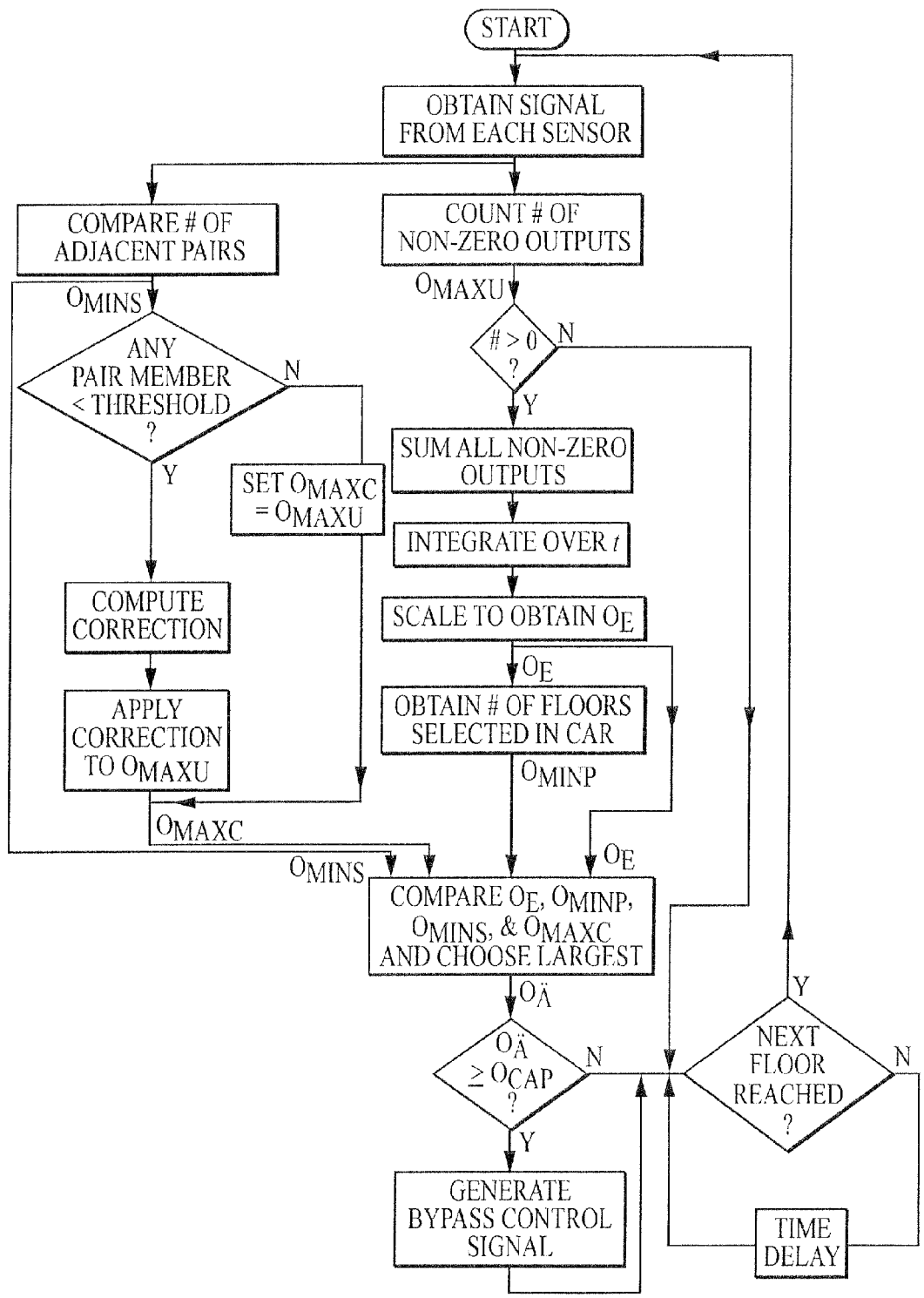
FIG. 10 is a logic diagram illustrating the method of operation of the capacity sensing sub-system of FIG. 8.

Lastly, the sub-system 800 utilizes (i) the first occupancy estimate $O_E$, (ii) the corrected occupancy upper limit $O_{maxc}$ determined by the number of sensors 806 with non-zero output that exceed the predetermined threshold value, (iii) first occupancy minimum $O_{mins}$ as determined by the number of adjacent sensor pairs, and (iv) second occupancy minimum $O_{minp}$ as determined by the number of floors selected within the car 180, to produce a final occupancy estimate. Specifically, this final occupancy estimate $O_f$ is the greater of the first occupancy estimate, corrected occupancy upper limit, the first occupancy minimum, and the second occupancy minimum. In the foregoing example, these quantities are 4.33 persons, 5 persons, 3 persons, and 5 persons; hence, $O_f$ equals 5 persons. Note that the highest value is chosen for conservatism; this all but eliminates instances of the elevator car stopping at a floor with an active call signal when no additional room exists, yet does not so under-utilize the car's capacity so as to be grossly inefficient. FIG. 10 illustrates the logical flow of the foregoing embodiment of the method.

As a second example of the operation of the capacity sensing sub-system 800, consider if 16 children each having a weight of 75±20 lbs. (and an average weight of 75 lbs.) were present in the previously described elevator car. The total combined weight would equal 1200 lbs., and therefore $O_E$ would equal 1200/150 or 8. If $O_E$ alone were used in this instance, it would severely overestimate the remaining capacity of the elevator car. Next, assume each child to take up the space associated with one sensor, whether individually or in combination; hence, $O_{maxu}$ would equal 16, and $O_{mins}$ would equal 8. Since no sensors 806 would register less than the assumed threshold value of 50 lbs. (i.e., each sensor would be associated with one whole child or one-half of two children), $O_{maxc}$ would equal $O_{maxu}$. If 2 different floors were selected by the 16 children, then $O_{minp}$ would equal 2. Hence, in this example, $O_f$ would equal $O_{maxu}$ or 16 persons, which matches the actual occupancy exactly.

Note that due to the reduced size of children as compared to the average adult, it may be possible to have somewhat more children than adults within a given floor space of the elevator car; however, this effect is considered minimal since a child is generally much shorter than the average adult, and hence grows disproportionately in height as opposed to width (the latter relating to floor space required to accommodate them). Stated differently, there is a minimum of floor space that any free-standing human requires; this value can be estimated and built into the sensor array design of the present invention.

When the capacity of the elevator car 180 is reached, either by total sensed weight or by the maximum number of occupants allowed (a predetermined value) as estimated by the sub-system 800, any subsequent call signals received by the elevator control circuit 830 are routed to another available car based on inputs received from a micro-controller 817. In this fashion, the fully loaded car bypasses those floors with people desiring to get on the elevator, unless those floors are selected by one or more of the occupants of the car 180.

Similarly, as each successive floor selected by occupants of the elevator car 180 is reached (as based on an door open sensor 850 within the elevator control logic, or other indicia), the sub-system 800 recalculates the first occupancy estimate $O_E$, the corrected occupancy upper limit $O_{maxc}$, the first occupancy minimum $O_{mins}$, and the second occupancy minimum $O_{minp}$ and produces a new final occupancy estimate $O_f$ based thereon. Hence, occupancy estimation according to this embodiment is an ongoing and dynamic process.

Monitoring and Security Sub-System

Figures 11, 12:
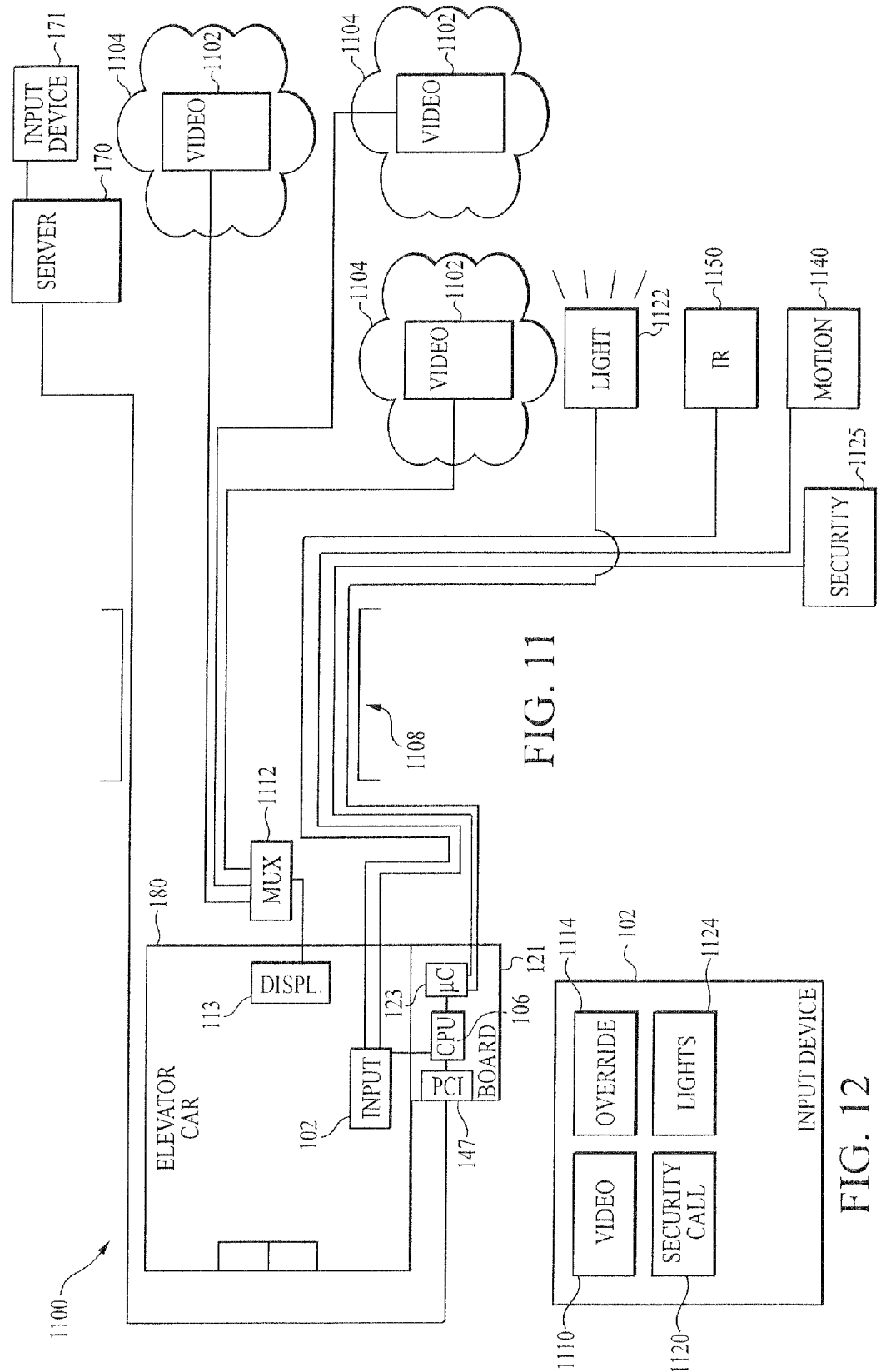
FIG. 11 is a block diagram illustrating one embodiment of the monitoring and security sub-system of the present invention.
FIG. 12 illustrates one embodiment of the elevator car touch panel used in conjunction with the monitoring and security sub-system of FIG. 11.

Referring now to FIGS. 11 and 12, the information system 100 of the present invention optionally also includes an external monitoring and security sub-system 1100 to enhance the safety of the occupants and provide "early warning" of possible threats. Specifically, the aforementioned display device (s) 113 within the car 180 may be configured using one or more preset function keys to provide a display of the area immediately surrounding access to the elevator on certain selected floors, such as parking garages. Video cameras 1102 of the type well known in the electronic arts are positioned at certain advantageous locations 1104 surrounding the elevator car doors on certain floors of interest generate a video signal which is passed to the information system displays 113 through the aforementioned coaxial cable in the elevator wiring harness 1108. These video signals are selectively input to the display unit 113 for viewing by the car occupants. As shown in FIG. 12. the display unit is controlled using "Video" function keys 1110 on the keypad 116 or touch screen 113 to permit the user to select one or more floors to view. "PIP", or "picture-in-picture" technology of the type well known in the electronic arts, along with a video multiplexer 1112 allows users to cascade two or more images on the display 113 if required. The user can over-ride the car stopping at any selected floor if desired, simply by depressing the "Override" function key 1114 followed by the numeric key corresponding to the floor number. This override function can be instituted any time up until the signal is generated by the elevator control circuit 830 and associated logic to open the elevator car doors 1106 at that floor. The user can also contact a remote security station 1125 if desired using a "Security Call" function key 1120 present on the keypad 116 or the touch screen 113, and/or initiate temporary additional lighting 1122 in the area by depressing a "Lights" function key 1124.

The features described above can also be "locked out" during certain periods of the day (such as during busy morning or afternoon hours) when many people ride the elevators and the viewing, override, security, and lighting functions are generally not needed. For example, programming of the processors 106 within each elevator car in an office building could institute the monitoring/override function from the hours of 6 pm until 8 am and during weekends. Such programming can be reconfigured using the remote system server 170 and associated input device 171, as shown in FIG. 11.

Figure 13:
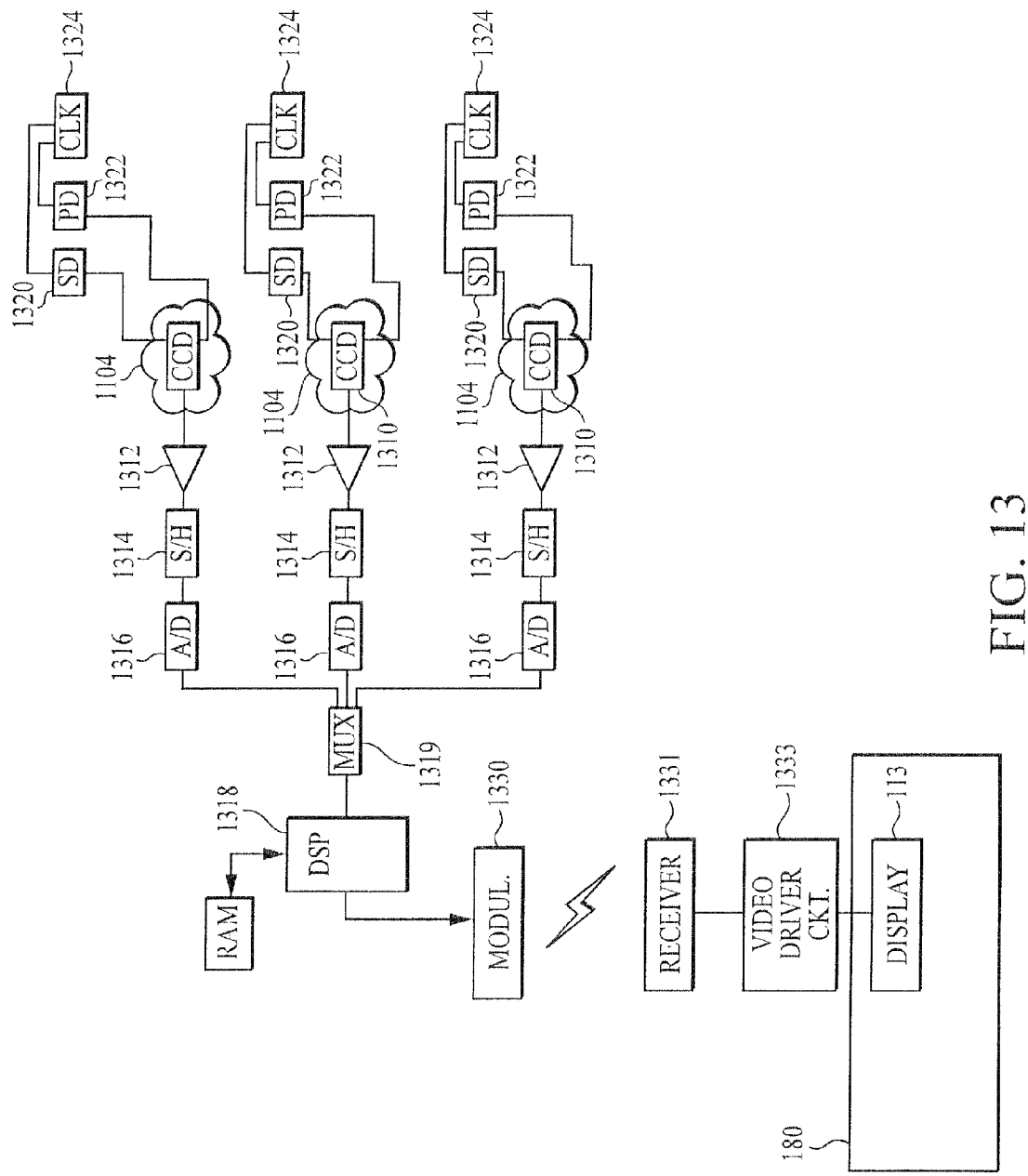
FIG. 13 is a block diagram of a second embodiment of the monitoring and security sub-system of the present invention.

In an alternate embodiment (FIG. 13), one or more miniature CCD cameras 1310 are positioned at various locations 1104 around the elevator doors 1106, so as to be effectively invisible to any person standing in those locations. In this fashion, criminals waiting to assault the occupants of the elevator car upon their egress would likely not be alerted to the presence of the monitoring system or cameras, thereby removing incentive for them to wait in unmonitored areas so as to avoid being seen by the cameras. The CCD cameras 1310 of the embodiment of FIG. 13 output analog signals to amplifiers 1312, a sample and hold circuit 1314, and A/D converters 1316, and then to a digital signal processor 1318 running a video compression algorithm via a multiplexer 1319. Serial and parallel drivers 1320, 1322 and a clock driver 1324 are also used to support operation of the CCD 1310, as is well understood in the electronic arts. The compressed data is then modulated onto an RF carrier by the modulator 1330, or alternatively a direct sequence or frequency hopping spread spectrum waveform for transmission to the display unit 113, which incorporates a spread spectrum receiver 1331 and video driver circuit 1333. Using the foregoing architecture, video images generated by the CCD cameras 1310 are digitized and compressed so as to reduce the bandwidth required to transfer images to the display unit(s) 113. It will be recognized that other architectures for generating and transmitting video data between a remote location of the cameras 1310 and the display unit 113 of the present invention are possible; the foregoing embodiments are merely illustrative of two of such architectures.

Referring again to FIG. 11, the monitoring and security sub-system 1100 described above also optionally provides for the display of data from motion detectors 1140 mounted in the vicinity of the elevator doors 1106, yet out of the field of view of the video cameras 1102, 1310. A well known tactic of criminals is to wait in poorly lighted areas adjacent to elevators in order to ambush unsuspecting victims emerging from the elevator once the doors are closed. In lieu of multiple video cameras 1102, motion detectors 1140 (such as those of the ultrasonic type) or alternatively, infrared radiation detectors 1150 may be mounted in such areas to apprise the occupants of the elevator that a person is likely present in an area adjacent to the elevator doors on a given floor. This information is displayed to the user within the elevator using any number of display formats, such as a light emitting diode, or flashing portions of an electronically generated display of the floor of interest corresponding to the locations of the detector (s), as shown in FIG. 12.

Figure 14A:
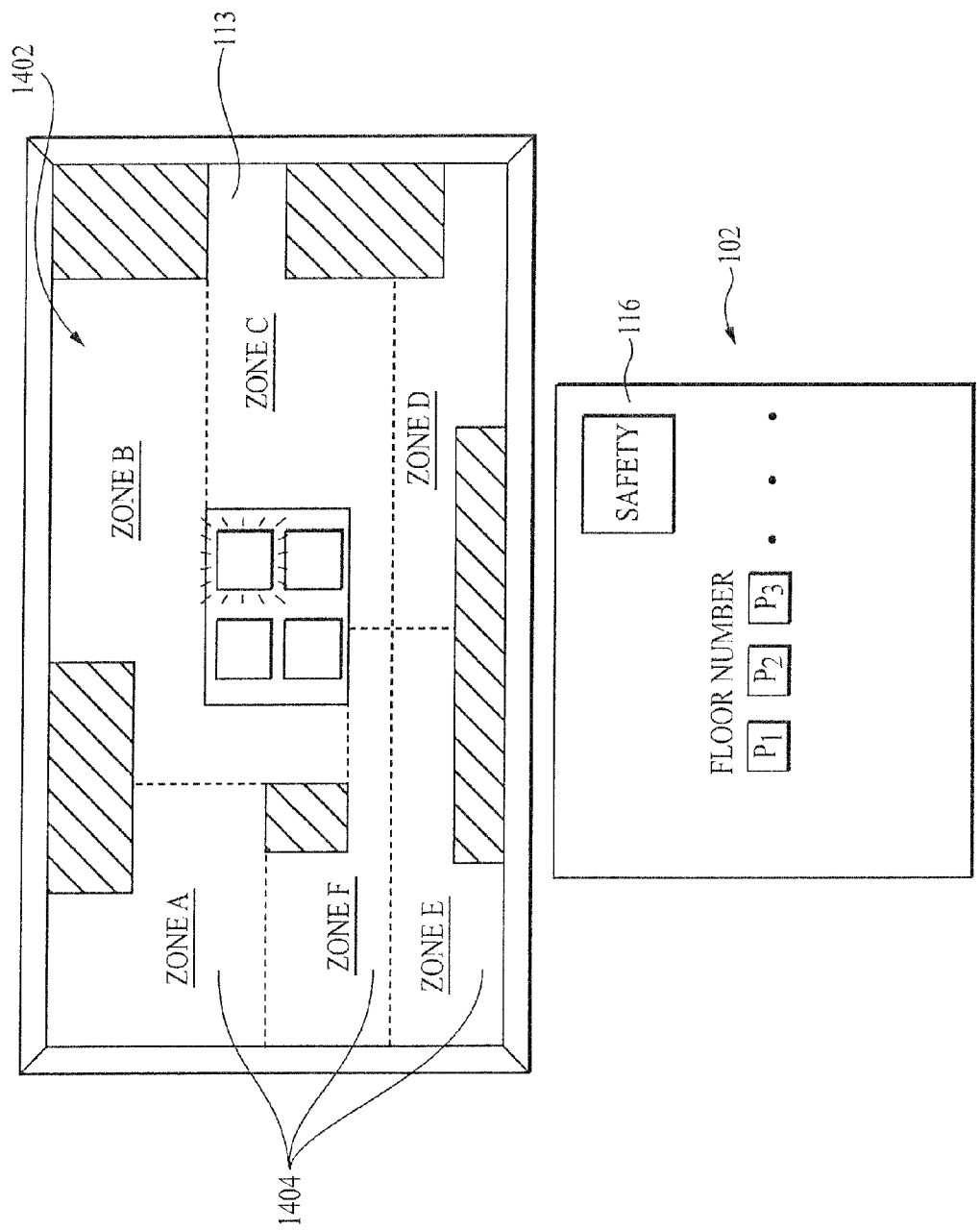
FIGS. 14a and 14b are plan views of one embodiment of the parking and video monitoring displays, respectively, of the monitoring and security sub-system of FIG. 11.
Figure 14B:
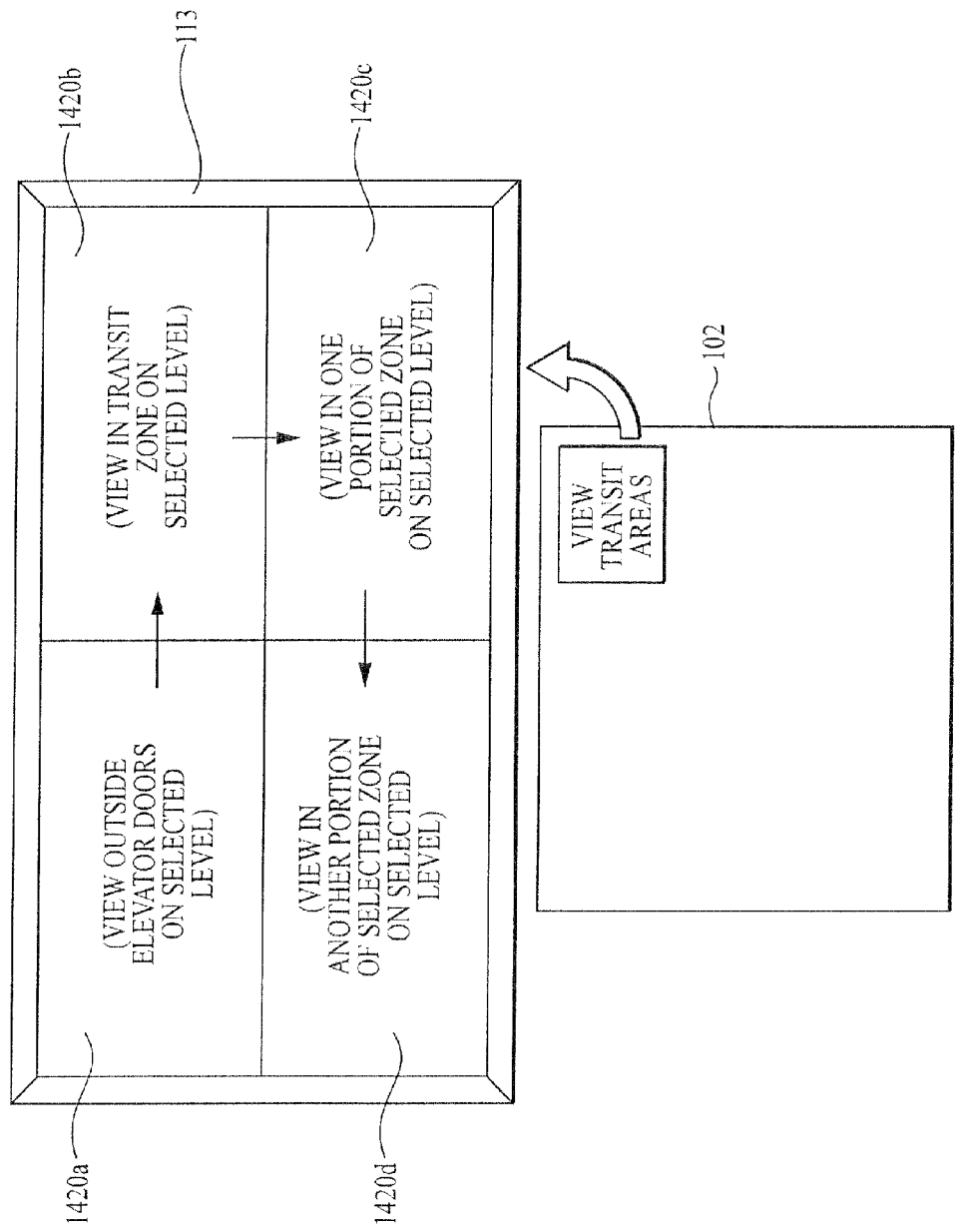

In addition to the aforementioned "early warning" features, the present invention also optionally includes the capability by which the user can select the specific location on the floor of interest to which they will be traveling from inside the elevator car, thereby enabling additional lighting, video surveillance, or other features. In one embodiment, shown in FIG. 14*a*, a video or graphic representation 1402 of the floor selected by the user is generated and displayed on the display unit 113 of the information system 100. Specifically, the floor display 1402 is initiated after the user depresses a dedicated function key (for example, a "Safety" function key on the keypad 116, or "soft" key on the touch screen 113; not shown) followed by the floor number or designation. The user then inputs the destination to which they will be travelling on that floor by touching a corresponding area of the touch screen 113. This input is converted to coordinates within the floor by an algorithm running on the processor 106 (FIG. 1), which are then correlated by the processor 106 to one or more of several zones 1404 within the floor lighting system and/or security video monitoring systems present within the building. This lighting and video monitoring equipment is then selectively activated for the zone(s) between the elevator doors and the destination, thereby providing enhanced visibility for the user during their travel, and also video monitoring by the building's centralized security facility 1125. Lighting and video monitoring is activated through a micro-controller 123 and associated control circuitry 1412 connected to the keypad 116 as shown in FIG. 1, although other configurations may be used. An audio or visual alarm 1414 is actuated in the security facility 1125 to alert security personnel of the activation of the video monitoring function for that floor/zone, thereby drawing their attention thereto. Alternatively, in another embodiment, the signal from the remote video equipment is routed to the system 100 and display 113 within the elevator car 180, thereby allowing the occupant to monitor the areas which they will be traversing. In such embodiment, the video presented on the display panel screen is segmented into multiple parallel "windows", such as into four segments 1420a-d corresponding to four video cameras located between the elevator car and the selected destination on the floor of interest as shown in FIG. 14b.

The operation of the foregoing functions is best illustrated by the example of a parking garage in the basement of an office building, in which a user has parked during late night hours. Such garages typically are located on the ground level or basement of the building and are open to pedestrian access, thereby making them more accessible to criminals. During late night or weekend hours, these garages are also often deserted. When the user enters the elevator car 180 on a higher floor within the building, they first select the floor number to which they desire to travel, in this case the garage ("G") level. The user may then depress the "Video" function key 1110 followed by the "G" key on the keypad 116 (or touch screen 113) to monitor the video camera output at the door of the elevator 1106 on the garage level, as well as any motion or IR sensors 1140, 1150 located thereabouts. Assuming no indications of danger are present, the user then depresses the "Safety" function key 1111, which displays a map or plan view 1402 of the floor selected in relation to the elevator doors 1106. The user then touches the map 1402 in the general area where their car is parked, which activates the lighting in the zones between the elevator doors and the selected location if not already activated, and initiates a direct video feed to the building security office 1125 (or other desired location) from the video cameras 1102, 1310 covering those zones. These functions may be put on a timer or controlled by another input (such as the timeout of a motion sensor 1140 in the area) such that the monitoring functions are ceased at an appropriate time or upon the occurrence of a desired event. The system may also be programmed to handle multiple zones on the same floor (such as when multiple passengers on the elevator car 180 are parked on the same level), or multiple zones on different floors.

Identification and Access Sub-System

Figure 15:
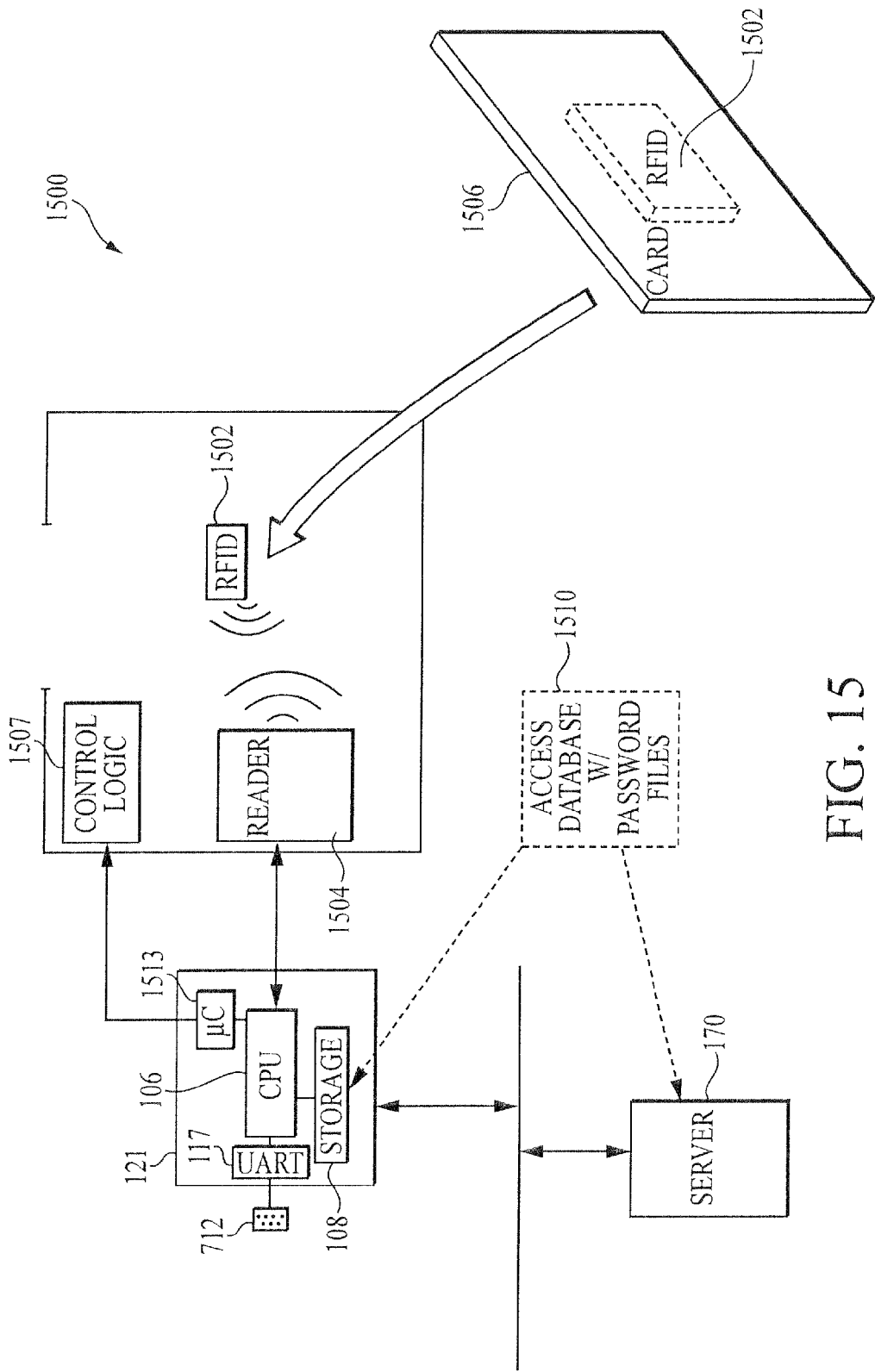
FIG. 15 is a block diagram illustrating one embodiment of the identification and access sub-system of the present invention.
Figure 16:
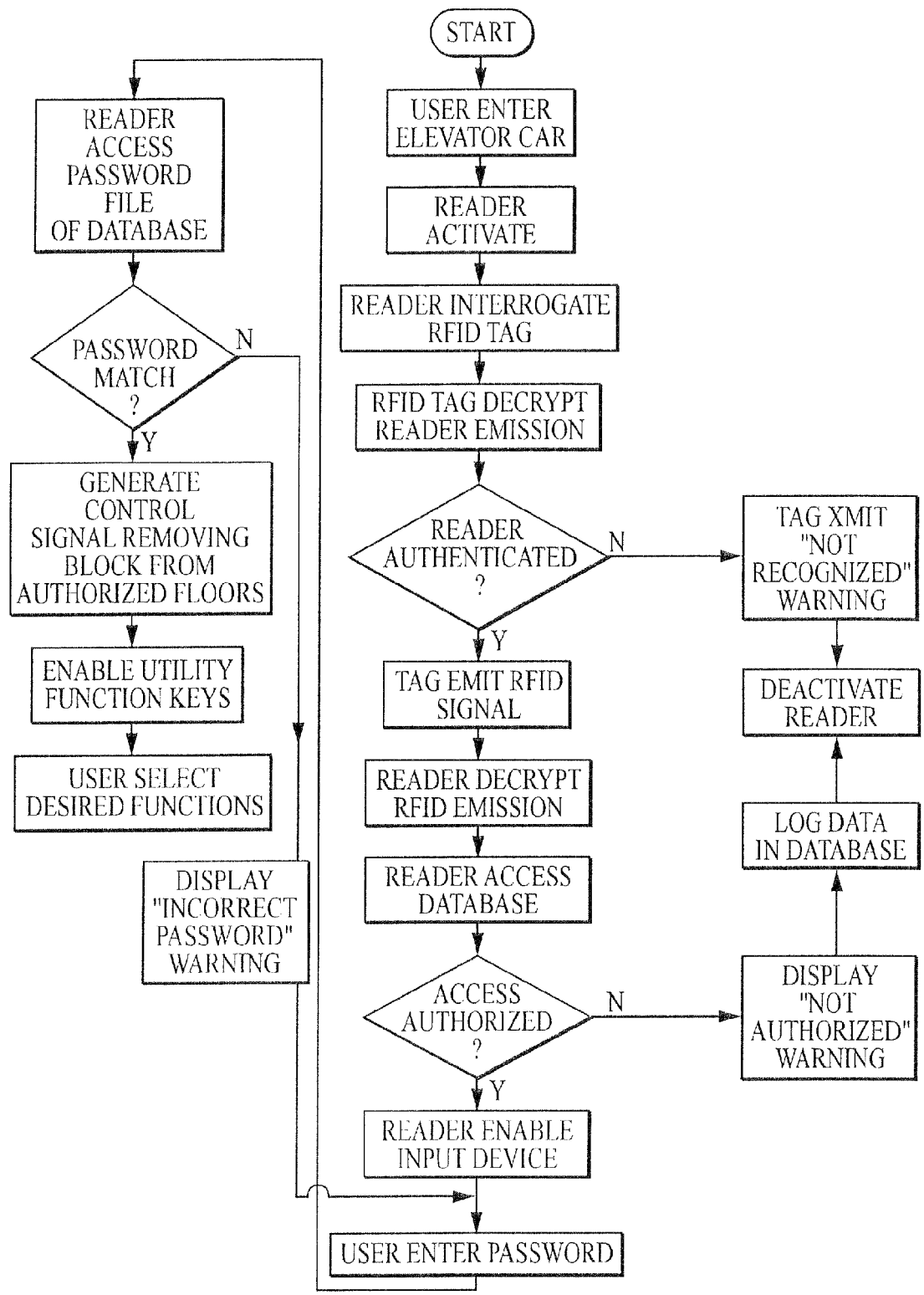
FIG. 16 is a logic diagram illustrating the operation of the identification and access sub-system of FIG. 15.

Referring now to FIGS. 15 and 16, the occupant identification and access sub-system 1500 of the present invention is described. As shown in FIG. 15, the identification and access sub-system 1500 generally comprises an RFID tag 1502, reader 1504, and access database 1510 of the type well known in the art, which uniquely and automatically identifies occupants of the elevator, and provides them access to certain restricted floors. In one embodiment, the RFID tag 1502 of the present invention authenticates the tag reader 1504 of the access sub-system 1500 such that when the tag 1502 is interrogated by the reader 1504 (such as when the user steps into the elevator car 180), an appropriate code or password must be provided within the RF signal from the reader for the tag 1502 to radiate its RF identification signal. See FIG. 16. In this fashion, unauthorized access to the RF signature or emissions of the tag 1502 through use of an unauthorized reader are frustrated. However, this technique can potentially be defeated through the coincident monitoring of the tag's emissions at close range when interrogated by an authorized reader 1504, and subsequent replication of the monitored emissions from the tag 1502 to the authorized reader 1504. Accordingly, in conjunction with the aforementioned reader authentication process, the RFID tag 1502 and reader 1504 of the present invention also optionally utilize an encrypted data protocol, such that any transmissions from the tag 1502 are encrypted, and accordingly must be decrypted by the authorized reader 1504 before the access database 1510 is searched. In one embodiment, the RFID tag 1502 and reader 1504 comprise a direct sequence spread spectrum (DSSS) communication system incorporating a PN (pseudo-noise) spreading code of the type well known in the communications art. In another embodiment, a frequency hopping spread spectrum (FHSS) having a hopping sequence is used to enhance security. The use of passwords, encrypted data protocols, and spread spectrum techniques for security is well known in the art, and accordingly will not be described further herein. See U.S. Pat. No. 5,539,775 entitled "Modulated spread spectrum in RF identification systems method" issued Jul. 23, 1996, and U.S. Pat. No. 5,629,981 entitled "Information management and security system" issued May 13, 1997, both incorporated herein by reference in their entirety.

In the embodiment of FIG. 15, an RFID interrogator/reader 1504 is placed within the walls of the elevator car 180. The reader 1504 has limited range and is directional in nature such that it will not interfere with the readers of other elevator cars nearby or other RF devices. The reader 1504 interrogates the passengers of the car based on sensing their presence, such as by (i) the user depressing the elevator call button and the doors being provided an "open" signal by the control system; or alternatively (ii) by sensing pressure on the one or more piezoelectric sensors 806 present within the flooring of the car as shown in FIGS. 8-9 above. As will be recognized by those of ordinary skill in the art, myriad different schemes for activation of the reader 1504 are possible, all being contemplated for use with the invention disclosed herein. As shown in FIGS. 15 and 16, the reader interrogates any RFID tags 1502 in the possession of the car occupants, which in turn respond by emitting RF energy at a particular frequency when proper authentication of the reader occurs. The RFID tags 1502 of the present invention are advantageously embedded within a thin profile access card 1506 for ease of carrying by the user, although other configurations may be used. The RF signal(s) received by the reader 1504 are then compared by the processor 106 to a list of known or authorized entrants and their accessible locations residing within a database 1510 stored on the file server 170 or locally on the storage device 108, 110 in order to find the entry or entries corresponding thereto. At this point, any matching entries found cause the processor 106 to signal a micro-controller 1513 to initiate a call signal to the control logic 1507 for a specific floor or floors authorized for access during after-hours operation per the data file 1510, subject to proper password entry by the user. The user is then required to authenticate using a password input via the input device 102 or touch screen 113 located inside elevator 180. Alternatively, one or more recessed or view-obstructed alpha-numeric keypads (not shown) are disposed within the elevator car to permit the user to enter their password without it being seen by other occupants.

In the event that multiple RFID tags 1502 are present on the car 180, yet multiple occupants carrying such tags wish to go to a single location (such as if one person with authorization for access to floor "A" is accompanying persons with authorization for other floors only), the other tag holders need only not authenticate the non-desired floors, at which point the system will refuse access to those floors, and not generate a call signal via the micro-controller 1513. Hence, people may only egress the elevator on the authenticated floor(s), or the lobby.

Additionally, the access sub-system 1500 can optionally notify security (and/or the destination floor) of the user's destination and identity, and maintain a record of access. Such notification may be useful for monitoring the location of individuals within the building, and/or advance warning of the arrival of a particular person. Furthermore, such security records can be used to archive the history of access to particular areas during certain periods of time. The records may be maintained on a remote central server 170, or locally within the access system 1500 itself.

Figure 17:
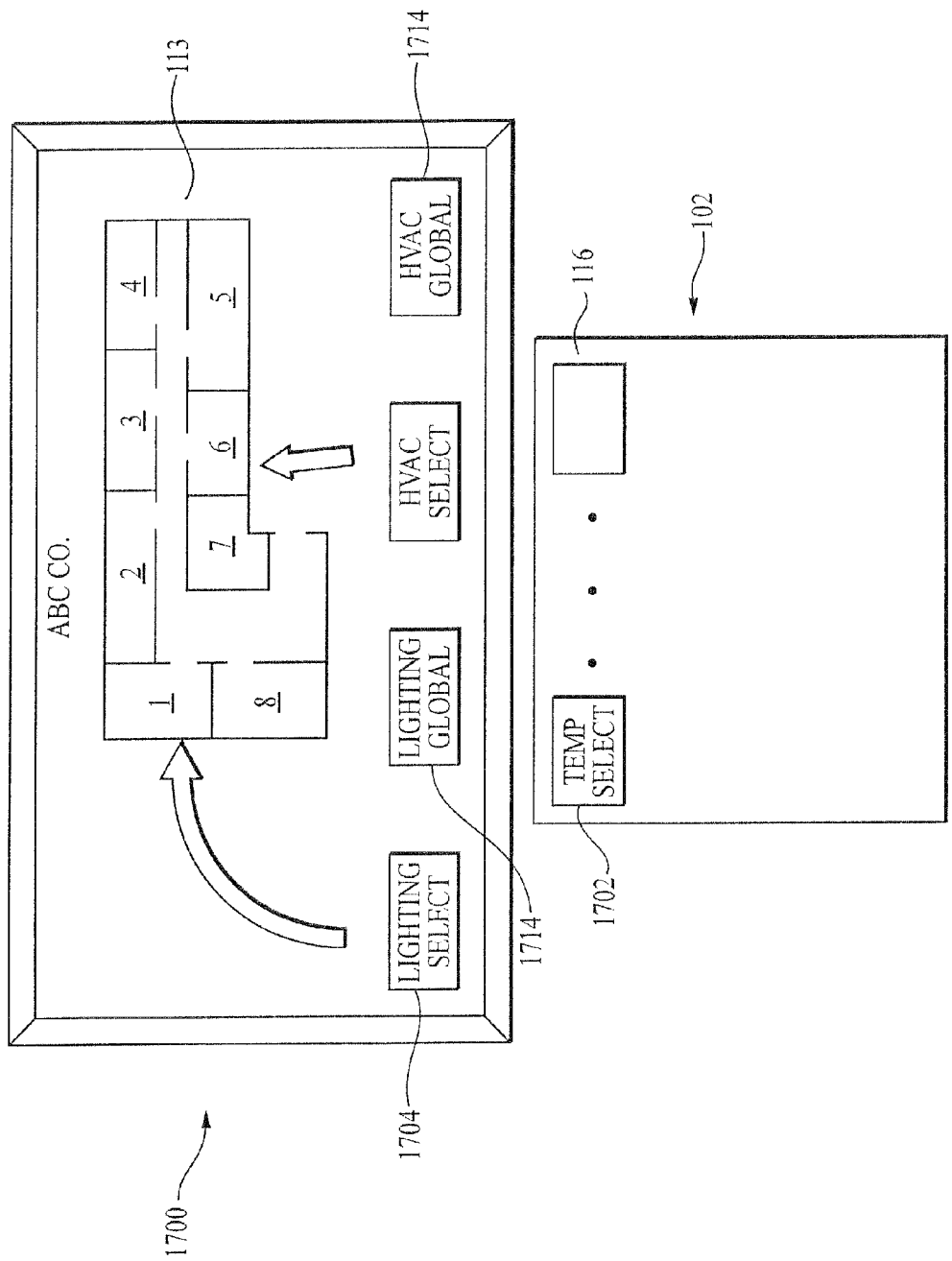
FIG. 17 is a plan view of one embodiment of a utility services selection display associated with the identification and access sub-system of FIG. 15.

The user may also optionally perform other functions such as lighting and environmental control from the elevator car 180 using the access sub-system 1500. Specifically, in one embodiment, the authenticated user is provided a display 1700 with several predetermined function keys 1702, 1704 disposed thereon, as shown in FIG. 17. The functions associated with the keys include, for example, initiation or termination of lighting or HVAC in various areas of the destination floor. The display may comprise a set of function keys 1702, 1704 on a keypad 116 as described above, or alternatively comprise a graphic display on the touch screen 113. Many other display formats and techniques, such as "soft" function keys on the keypad 116, which allow multiple functions per key depending on operating mode, are possible. Using the access sub-system 1500, the user may selectively start remote equipment such as lighting and/or HVAC on the authenticated floor in advance of their arrival, and all from a single convenient location. Additionally, the RFID tag 1502 for a given user may be encoded with information indicating the location of the user's individual office or work area. Hence, when the user is authenticated and selects either the HVAC or lighting initiation functions, these services are only activated in a limited portion or certain zones of the floor, thereby saving on energy costs. If the user desires, he/she may initiate the foregoing services for their entire suite or floor (subject to authorization) by depressing the "Global" function keys 1714 on the keypad before selecting the service.

Lastly, the user may also use their RFID tag 1502 to permit the information and control system 100 of the present invention to pre-configure the PED download function described above upon receipt of an authenticated RFID signal. Specifically, the access sub-system 1500 "remembers" each individual user's selected download configuration by storing a data file at an address on the storage device 108, 110 or server 170 referenced within the aforementioned security access database 1510. As described above, each time the tag 1502 authenticates the reader 1504 and the tag emits it's RFID signal (which is subsequently decrypted by the reader 1504), the access control sub-system 1500 attempts to match the user's ID to one located within the access database 1510. Upon a successful match, the access sub-system 1500 also retrieves the download configuration file from the address referenced in the database 1510 associated with that user ID, and stores it in local memory or storage 110, 108. Upon user authentication with the appropriate password via the input device 102, the information and control system 100 transfers the download configuration file from memory 110, 108, whereby the user may receive the pre-configured download simply by inserting their PED 704 into the data terminal 702 associated with the authenticating input device 102. Note that when multiple users with distinct RFID tags 1502 are present in the elevator car, the sub-system 1500 only transfers the download configuration file to the control system 100 for those users completing password authentication, and then only to the data download terminal 702 associated with the authenticating input device 102. Hence, multiple people within the elevator car 180 may authenticate and download data simultaneously, if desired (assuming that the elevator car is equipped with multiple data download terminal/input device pairs).

Adaptive Advertising Sub-System

Referring now to FIGS. 1 and 18*a-d*, the adaptive advertising sub-system of the information and control system 100 is described. Using this advertising sub-system, the aforementioned elevator display devices 113 and information and control system 100 may be programmed to provide adaptive advertising or information. As shown in FIG. 1, the advertising sub-system 1800 is comprised of components resident within the information and control system 100, as well as data files and an adaptive algorithm (not shown) running on the processor 106. Specifically, the speech recognition module 104, DSP 125, processor 106, and other related components previously described recognize speech and convert this speech into a digital representation. These digital representations are analyzed by the adaptive algorithm in one of two adaptive modes: 1) prompt mode, and 2) statistical mode, as described below.

Figure 18A:
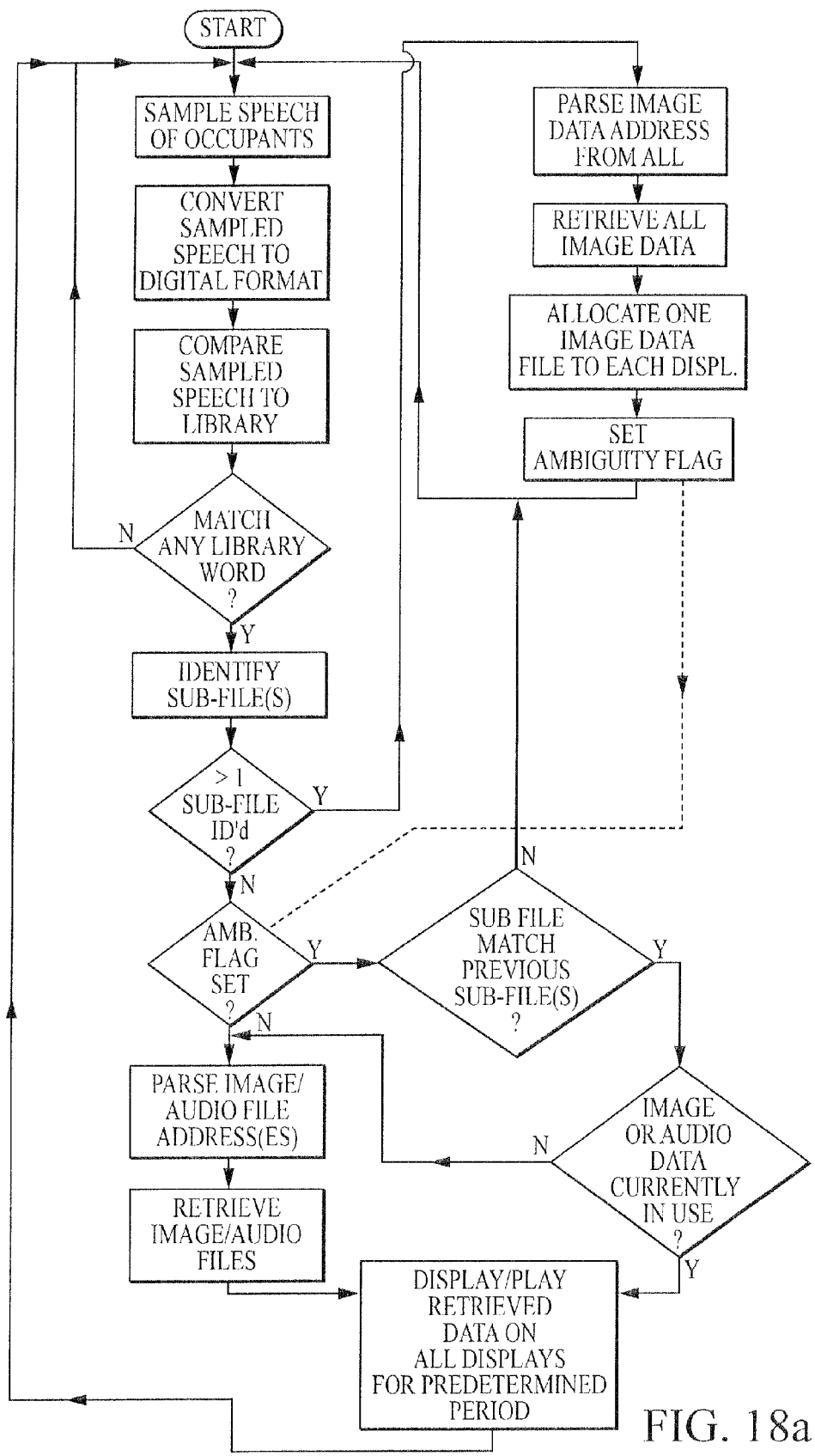
FIG. 18a is a logic diagram illustrating the operation of a first embodiment of the prompt mode of the adaptive advertising sub-system of the invention.
Figure 18B:
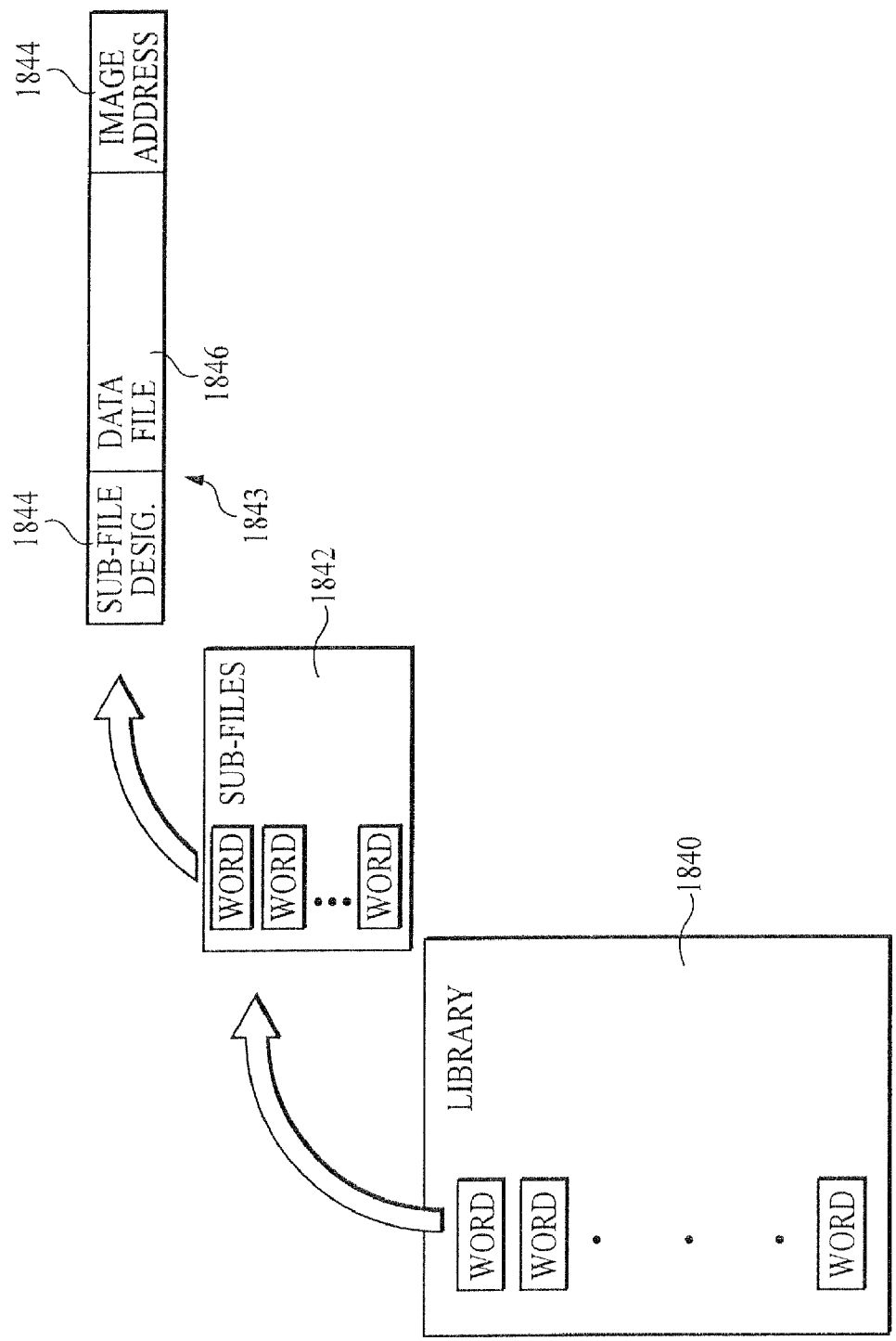
FIG. 18b illustrates the library data file structure used in conjunction with the advertising sub-system of the invention.

In prompt mode, the speech of one or more passengers on the elevator car 180 is sampled and analyzed in real time to determine the general topic of conversation between the passengers. FIG. 18*a* illustrates the logical flow of the prompt mode process. Specifically, the processor 106 (FIG. 1) accesses a stored data file or library of sub-files of keywords stored on the remote server 170 or local storage device 108 which relate to certain topics of interest. The library 1840 (FIG. 18*b*) ideally does not contain common words such as conjunctions, prepositions, or the like, but rather unique and preferably multi-syllabic words which are not generic to many different topics. For example, the words "deposition" or "litigation" may be used as keywords indicating the presence of a member of the legal profession. The predefined library 1840 of keywords arranged into sub-files 1842 is present on the server 170 or storage device 108; this library 1840 may be based on knowledge of the building's tenants, on some demographic factor common to people who most often use the elevator, or other factors. As illustration, the foregoing library sub-file 1842 consisting of, inter alia, the terms "deposition" and "litigation" would be appropriate for an application which is frequented by attorneys or paralegals. When the speech recognition module 104 compares and matches these library terms with the actual speech of the occupants of the car, a binary value indicative of the matched library sub-file 1842 is generated. Note that these sub-files 1842 are not physically separate files in the present embodiment, but rather "virtual" files that relate to their organizational commonality. Specifically, each library word 1843 or entry includes several consecutive bits (such as an 8-bit data word 1844 in the present embodiment) appended on the beginning or end of the digital file data 1846 which indicate the sub-file(s) with which the word is associated. When a digital representation of a word within the library 1840 is matched, the data word 1844 appended thereto is used as an address for advertising image data (and/or CELP audio data) held in the storage device 108 or server 170. As a simple example, when the advertising sub-system matches the digitized form of the spoken word "litigation" to an entry within the library file, the 8-bit word appended to that entry of the library file is used to address the image and/or audio data file(s) relating to legal topics stored on the local storage device 108 (or server 170). This "legal"

image data may contain, for example, a representation of an advertisement for legal document services, or a talking advertisement for a law firm. The image data file is then retrieved and displayed on the display screen 113 using any number of well known graphic display techniques. The CELP or other format audio file is decompressed and converted to an analog representation using the speech synthesis module 112 (FIG. 1) and amplified over the speakers 111 in the elevator car 180 if desired.

The system is further configured such that if multiple image data files are requested by the processor 106, such as may occur when two different sets of people within the elevator car 180 are discussing two unrelated topics, each different image data file is allocated to a different available display 113 within the elevator car. For audio, only one data file is converted and played at any given time to avoid confusion. Furthermore, the sampling rate of the system may be set at a low frequency, such as once every 60 seconds, or only when the given elevator car 180 is in operation, so that a given image is maintained for an appropriate period of time on the displays 113.

In the event that a word is recognized by the advertising sub-system which includes two or more sub-file address references (such as for the word "trademark", which may have connotations relating to both intellectual property law and business), the sub-system allocates each of the ambiguous references to a separate display (up to the existing number of unused displays 113 at that time), and then attempts to resolve the ambiguity by waiting for the next word which is matched within one of the sub-files 1842 (FIG. 18*b*) whose designation is appended on the library entry 1843 for the first word. If that next matched word does not resolve the ambiguity, the process is repeated until the ambiguity is resolved. During ambiguity resolution, the existing file displayed on each display screen 113 is maintained for the duration of the process, thereby providing an apparently seamless display to the occupants of the car.

In an alternate embodiment of the "prompt" mode (FIG. 18*c*), the system accesses the building directory file discussed previously with respect to FIGS. 1-4 using the floors selected by the user to obtain pertinent advertising information. Specifically, when a passenger riding on the car 180 selects a floor via the floor selection panel (not shown), or alternatively calls the elevator from a given floor, the system accesses the building directory file to obtain information regarding the tenants on that floor. The building directory file for each tenant includes an appended data word which uniquely identifies the business area or other descriptive information about the tenant. For example, an intellectual property law firm residing on the fourteenth floor of a building would have an appropriate code, as represented by a multi-bit data word, indicating that they were engaged in the in (i) legal practice, and (ii) intellectual property as a sub-specialization. Whenever the fourteenth floor was selected within the elevator car 180, or alternatively whenever an elevator call was made from the fourteenth floor and answered, the system would display advertising images, video, or text messages relating to the field of intellectual property law within the calling/answering car until or beginning when the fourteenth floor was reached, respectively. If multiple floors were selected within the car, as is commonly the case, the sub-system would prioritize the messages displayed based on the direction of travel of the car and it's proximity to a given floor. The system also optionally estimates the remaining time until the floor is reached as part of its analysis.

Figure 18C:
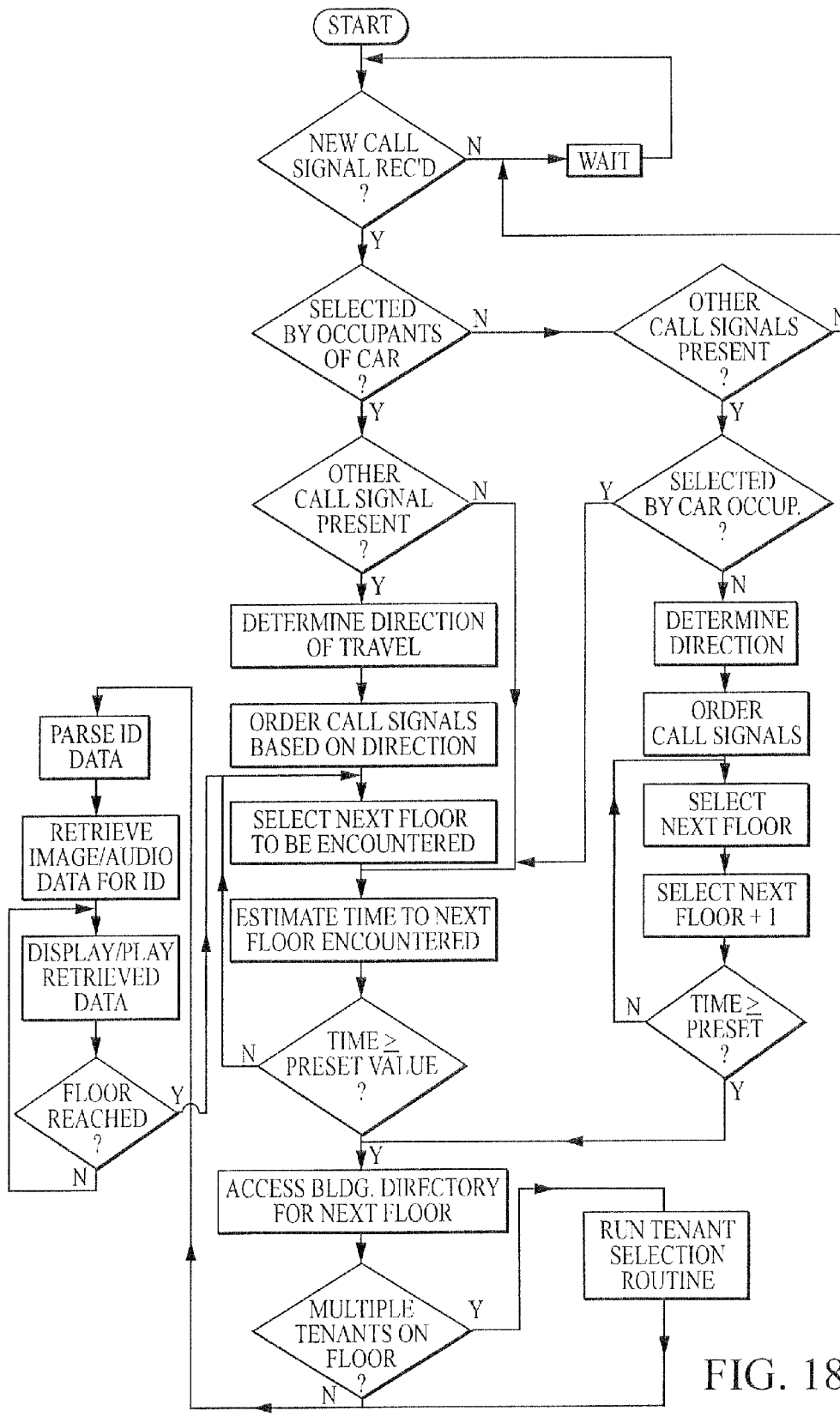
FIG. 18c is a logic diagram illustrating the operation of a second embodiment of the advertising sub-system of the invention.

As an example of the alternative embodiment of FIG. 18*c*, if four people enter the same elevator car at the lobby level, and each depress a different floor number (say the third, seventh, eighth, and eleventh floors), the sub-system 1800 would prioritize the first floor to be encountered (i.e., the third floor) in its direction of travel and display advertising pertinent to the tenant on that floor. Since the travel time between the lobby (first floor) and third floor would be only perhaps 10 seconds, the sub-system 1800 would choose advertising appropriate to that time slot, such as a fixed image. Once the car reached the third floor and the doors opened, the sub-system 1800 then prioritizes the next floor to be encountered (here, the seventh floor). Accessing the building directory file for the seventh floor, the sub-system 1800 would then choose advertising appropriate that floor and the remaining time available (perhaps 15 seconds). After the seventh floor was reached, the sub-system 1800 would then prioritize the eighth floor. If the time interval to the next floor was too short as determined by a predetermined parameter, such as a minimum time interval in seconds, the sub-system would prioritize the next floor whose time interval exceeded the minimum (in this case, the eleventh floor). When all passengers were unloaded, the car 180 would remain at the last selected floor (eleventh) until another call was initiated. When this new call was received, the sub-system 1800 would retrieve advertising relevant to the floor from which the new call was initiated, and display that information once the floor was reached by the car 180 (as determined by a position sensor, the opening of the doors, or any other well known means). It is apparent that under very crowded conditions where many often closely situated floors are selected by the occupants of the car, the sub-system 1800 may encounter few instances where the estimated time of travel of the car exceeds the aforementioned minimum parameter value. In such cases, the sub-system 1800 may be made to revert to "prompt" mode audio sampling as described above (FIG. 18*a*), or some other alternative scheme for selecting pertinent advertising. Many different variations of the basic approach described herein are possible, all of which are considered to be within the scope of the invention.

In the case of multiple tenants residing on one floor, the sub-system 1800 can be programmed to display images pertinent to each tenant on the floor based on a selection routine. In one embodiment, if multiple unrelated tenants occupy a given floor, and that floor is selected by a person entering the elevator at the lobby, the sub-system 1800 will pick image data relating to the different tenants on a rotating basis such that each subsequent time that same floor is selected, an image appropriate to a different tenant will be retrieved and displayed. Alternatively, the selection may be made random, or even be coupled to the speech recognition module 104 to weight one choice over the other(s). Many other arrangements are possible, all of which are considered to be within the scope of the invention disclosed herein.

Figure 18D:
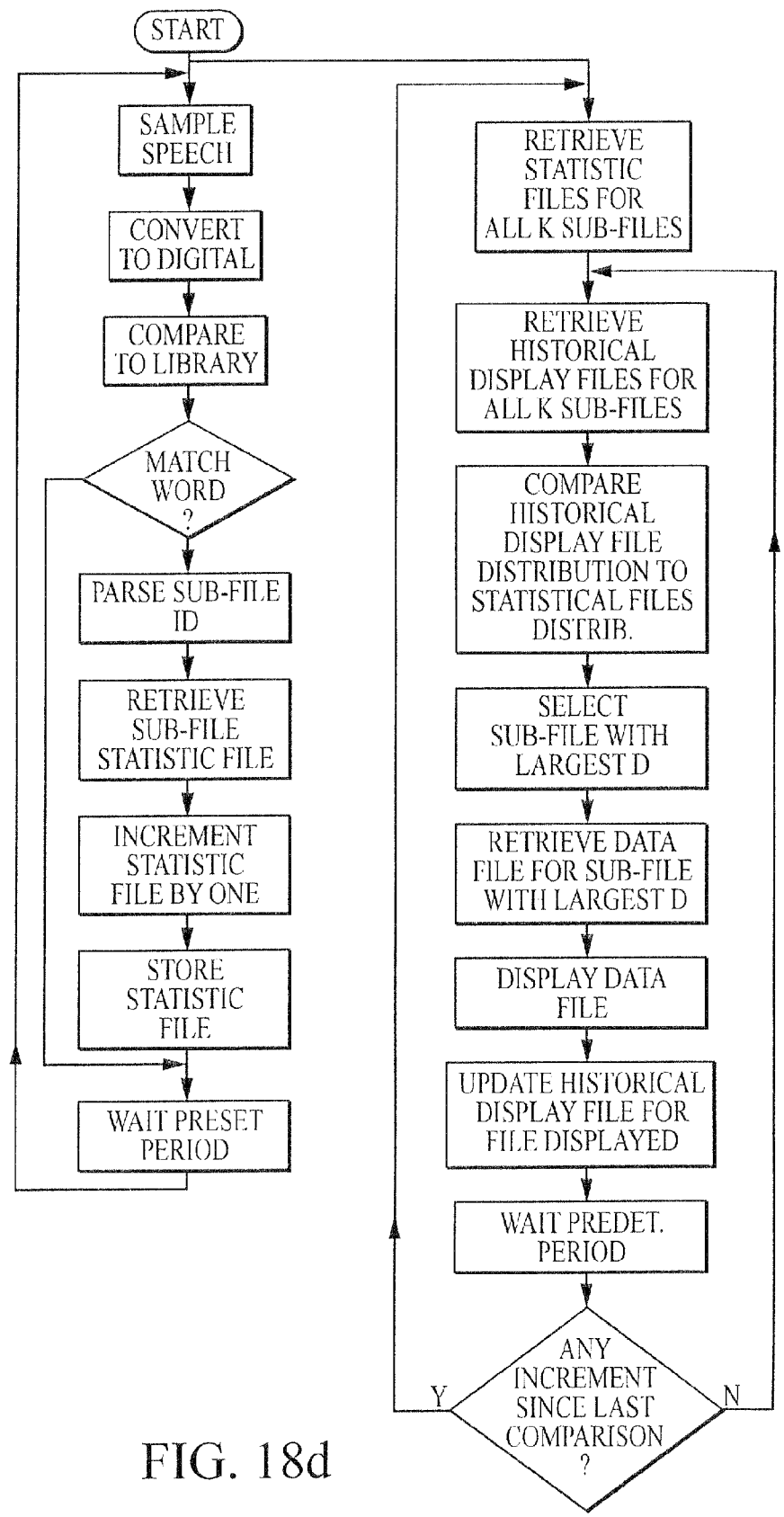
FIG. 18d is a logic diagram illustrating the operation of a third embodiment of the adaptive advertising sub-system of the invention.

Referring now to FIG. 18*d*, the so-called "statistical" mode of the adaptive advertising sub-system 1800 is now described. During operation in statistical mode, the sub-system 1800 gathers statistics on the speech patterns of its occupants over a predetermined (or open ended) period of time, in order to derive statistics on the most frequently encountered words within its library. Using prior examples, if a given building has a substantial population of law firms, the speech recognition system 104 may encounter legally-related words or sub-files present in its library 1840 (such as "deposition" or "litigation") most often. The system of the present invention effectively builds histograms for each of the words in its library 1840 over the sampling period, and structures its advertising accordingly. Specifically, as shown in FIG. 18*d*, the statistical mode algorithm running on the processor 106 of FIG. 1 increments a statistical data file on the storage device 108, 110, server 170, or other location. The sub-system 1800 samples this data file at a predetermined periodicity (such as every hour, every 24 hours, or every update cycle of the advertising display) to determine the distribution of occurrences of each word. This distribution is then compared to a historical data file which represents the number of instances advertising associated with each sub-file has been displayed. Advertising data files are then selected and displayed by the processor 106 and algorithm such that the desired proportionality between the sampled statistic and the display sequence is maintained. Returning again to the foregoing example, if words relating to the "legal" sub-file constituted 20% of the matches in the sampled data over a given period, then legally-related advertising would be displayed by the advertising sub-system approximately 20% of the time.

It is noted that the aforementioned speech-related adaptive advertising modes (FIGS. 18a, 18c, and 18d) may be automatically disabled when the speech recognition module 104 is in use or required by another function within the information and control system 100. For example, when the previously described "Building Directory" function key 122 is depressed, the prompt and statistical advertising modes are interrupted or frozen by the processor 106 until the selected function is terminated either manually by the user or via the expiration of a system clock (i.e., the function "times out"). This interrupt allows the building directory function to operate unimpeded without having to share resources within the information and control system 100 with the adaptive advertising sub-system 1800. It will be recognized, however, that the information and control system 100 may so configured to allow such parallel operation if desired.

Figure 19:
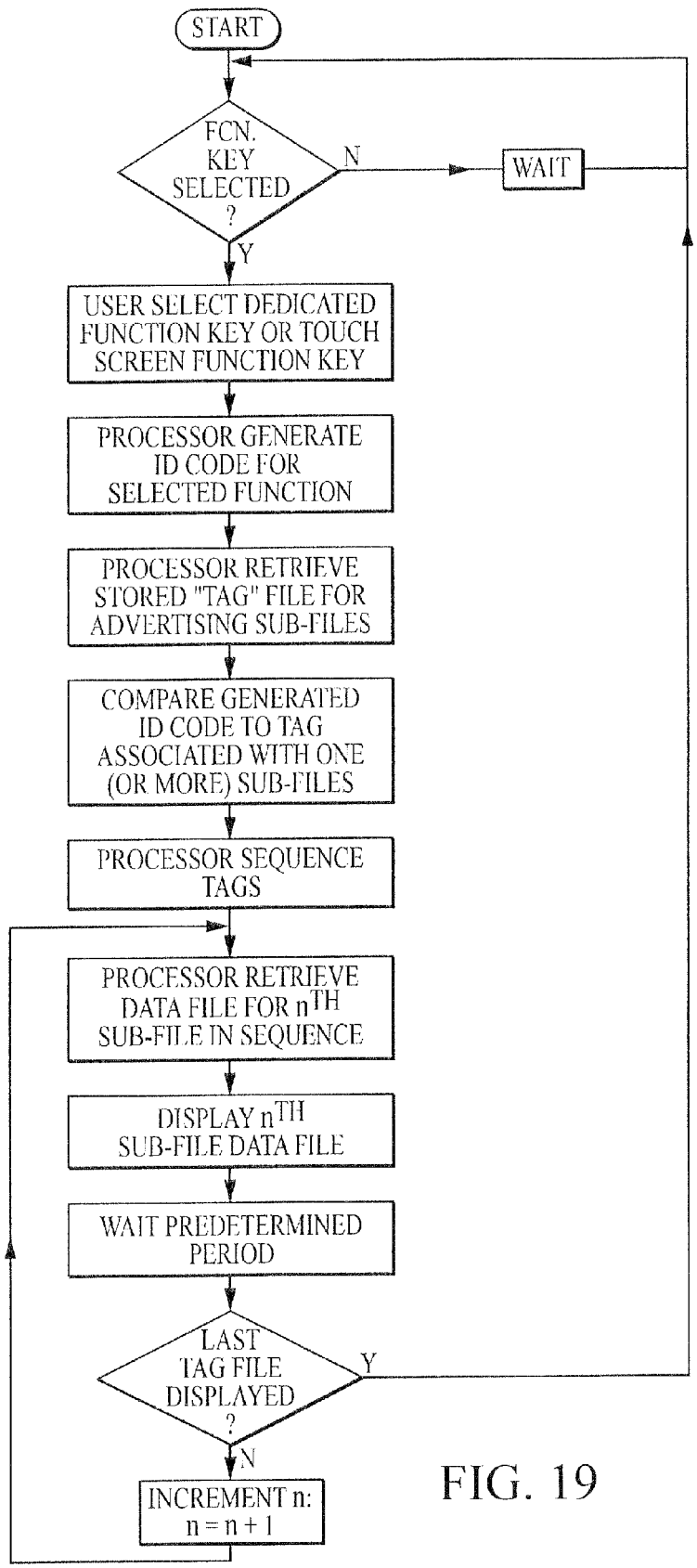
FIG. 19 is a logic diagram illustrating the operation of a fourth embodiment of the adaptive advertising sub-system of the invention.

Alternatively, the aforementioned network interface 300 of FIG. 3 may be used as an input to the adaptive advertising sub-system 1800. As is commonly used with prior art Internet browsers, adaptive "banners" display advertising related to a user's query on a search engine. In the present invention, the advertising graphics presented on the display 113 may either be anecdotally or statistically adaptive to the user's information queries. Specifically, in one embodiment of the anecdotal system (FIG. 19), user inputs received via the input devices 102 or touch screens 113 are provided to an adaptive algorithm which identifies each query type as falling within one or more predetermined categories. As the user selects a given function key 114, a code unique to that function key is also generated. The advertising data files, each having a "tag" (such as a code or data bits embedded or appended to the address in memory) are then searched by the algorithm to match those files having the same category tag. These files are then retrieved from the storage device 108, 110, or server 170 in a predetermined order (such as sequence based on ascending address locations, or some other parameter), and displayed on the display device 113. The display of these files may be in sequential fashion, each for a predetermined interval, or alternatively one file may be displayed until another function key 114 is selected. Many other display schemes are possible, consistent with the invention.

As an example of anecdotal adaptation, consider the case where the user selects the "Weather" function key on the keypad 116 (or touch screen 113). The sub-system 1800 retrieves and displays the desired weather information on the display device, while also retrieving and displaying advertising graphics relating to weather (such as for a local television station's weather reports) on an advertising placard or banner on the same or another display. If the user then selects another function key 114, the sub-system 1800 retrieves another advertising graphic file relating to the newly chosen function.

In a statistical adaptation, the choice of function keys 114 by each successive user adds to a data file which is generated by a statistical algorithm running on the processor 106. The algorithm calculates and stores a running total of the number of times each function key 114 (or each functional category) is selected over a predetermined period. Advertising graphics are displayed on the display unit(s) 113 in proportion to this statistic. For example, if the "Weather" function key were actuated five times as often as the "Stock Quotes" key over a given interval, the sub-system 1800 could be programmed to retrieve and display weather-related advertising on average five times as often as financial advertising Note that the foregoing anecdotal and statistical adaptation embodiments may also be used together. For example, the sub-system 1800 could be programmed to display advertising on a statistical basis during periods of non-use, while displaying advertising anecdotally during use. Many other variants are also possible.

It is noted that while various aspects of the invention disclosed herein are described in terms of specific embodiments (and logic diagrams) of methods and processes, other embodiments of these methods and processes are possible consistent with the invention. For example, certain steps in the disclosed methods may be deleted, and/or additional steps added. Furthermore, the order of performance of steps may in many cases be permuted, or multiple steps disclosed as being performed in series may be performed in parallel, and vice versa. The embodiments disclosed herein are therefore considered merely illustrative of the broader methods claimed herein.

While the above detailed description has shown, described, and pointed out the fundamental novel features of the invention as applied to various embodiments, it will be understood that various omissions, substitutions, and changes in the form and details of the device or process illustrated may be made by those skilled in the art without departing from the spirit of the invention.

What is claimed is:

1. Computer readable apparatus comprising a storage medium, said storage medium comprising at least one computer program with a plurality of instructions, said at least one program being configured to:
    receive input from a user via one of a plurality of different function keys associated with a touch-screen input and display device, each of the different function keys having a different context associated therewith;
    determine a context associated with the one function key;
    forward the determined context to a remote networked server for the selection of advertising content, the selection being based at least in part on the forwarded context; and
    present the selected content via the input and display device for viewing by the user.

2. The apparatus of claim 1, wherein the input relates to a location of a geographic area or point of interest.

3. The apparatus of claim 2, wherein the input relating to a location comprises an input relating to a point of origin for, or a destination of, travel.

4. The apparatus of claim 1, wherein the plurality of different function keys associated with a touch-screen input and display device comprise a plurality of different "soft" function keys that are selected and generated on the input and display device display by the at least one computer program.

5. The apparatus of claim 4, wherein the selection of the soft function keys depends at least in part on a display context determined by a user selection received via the input and display device, the user selection relating to a topical area.

6. The apparatus of claim 5, wherein the topical area comprises either finance or weather, and the received input from a user via one of a plurality of different function keys associated with the touch-screen input and display device comprises a request for stock quotes or a weather forecast for a particular location, respectively.

7. Computer readable apparatus comprising a storage medium, said storage medium comprising at least one computer program with a plurality of instructions, said at least one program being configured to:
receive input from a user via a first soft function key associated with a touch-screen input and display device;
based at least in part on the input, generate a plurality of different soft function keys on the input and display device, the different soft functions keys each having a different context associated therewith;
receive a second input via one of the generated plurality of soft function keys;
cause selection of advertising content based at least in part on the context associated with the one generated soft function key associated with the second input; and
present the selected advertising content via the input and display device for viewing by the user.

8. The apparatus of claim 7, wherein the one of the generated plurality of soft function keys via which the second input is received is associated with a geographic location, and the selected advertising content is related to one or more business entities at or proximate to that location.

9. The apparatus of claim 7, wherein the context associated with the one of the generated plurality of soft function keys via which the second input is received comprises a location having one or more business entities at or proximate to that location, and the selected advertising content is related to an attribute associated with at least one of the one or more business entities.

10. Computer readable apparatus comprising a storage medium, said storage medium comprising at least one computer program with a plurality of instructions, the storage medium being part of a computerized information system disposed on or within a transport apparatus configured to transport at least one person from one location to another, said at least one program being configured to:
receive an input from a user of the transport apparatus, the input relating to a desired function;
cause access of a remote server via an associated wireless interface to access information relating to the desired function;
receive accessed information via the wireless interface; and
implement the desired function using at least a portion of the received information;
wherein said at least one program is further configured to:
establish an ad hoc communication link with a portable computerized device of a user of the transport apparatus; and
download at least a portion of the received information to the portable computerized device via the communication link.

11. The apparatus of claim 10, wherein said download of said at least a portion of the received information to the portable computerized device via the communication link is initiated by software resident on the portable device.

12. The apparatus of claim 10, wherein said input relating to a desired function comprises an input to obtain information relating to at least one of (i) financial news; (ii) weather; or (iii) sports.

13. The apparatus of claim 12, wherein said input relates to weather, and said received information comprises information regarding local weather for the locale in which said transport apparatus is situated.

14. The apparatus of claim 10, wherein said input relates to directions to a particular business entity, and said received information comprises a map graphic illustrating how to get to said business entity.

15. The apparatus of claim 10, wherein:
said remote server is in communication with a database of business entities, said database being searchable at least by a name of a business entity; and
said input comprises a digitized representation of a speech input, the speech input being received via a microphone located within said transport apparatus, the speech comprising said name of said business entity.

16. The apparatus of claim 10, wherein the at least one computer program is further configured to cause evaluation of at least a portion of said input, and to cause presentation of advertising content that is contextually related to said input, said advertising content being presented via an output device in the transport apparatus.

17. The apparatus of claim 10, wherein the at least one computer program is further configured to cause evaluation of at least a portion of said input to determine a context, and to cause presentation of advertising content that is related to said context, said advertising content being presented via an audio output device in the transport apparatus.

18. The apparatus of claim 10, wherein the implementation of the desired function comprises synthesizing speech for playout over one or more speakers disposed within said transport apparatus, the speech being synthesized based at least in part on said received information.

19. The apparatus of claim 18, wherein said input relating to a desired function comprises an input to obtain information relating to at least one of (i) financial news; (ii) weather; or (iii) sports.

20. The apparatus of claim 10, wherein said received information is configured specifically for the user.

21. The apparatus of claim 20, wherein said configuration specifically for the user is based at least in part on data stored on a remote server, the data relating specifically to that user.

22. The apparatus of claim 21, wherein said data stored on a remote server relating specifically to that user is based at least in part on one or more previously supplied user-selected configuration parameters.

23. The apparatus of claim 10, wherein said input relating to a desired function comprises an input to obtain information relating to a particular destination or entity.

24. The apparatus of claim 23, wherein said at least one program is further configured to receive a second digitized representation of speech input relating to the particular destination or entity in order to resolve one or more ambiguities associated therewith.

25. Computer readable apparatus comprising a storage medium, said storage medium comprising at least one computer program with a plurality of instructions, said at least one program being configured to:
receive input from a user via one of a plurality of different function keys associated with a touch-screen input and display device, each of the different function keys having a different context associated therewith;
forward the input to a remote networked server for determination of at least one context associated with the one function key and selection of advertising content, the selection being based at least in part on the determined context;

receive the selected advertising content; and present the received content via the input and display device for viewing by the user.

26. The apparatus of claim 25, wherein the input relates to a location of a geographic area or point of interest.

27. The apparatus of claim 26, wherein the input relating to a location comprises an input relating to a point of origin for, or a destination of, travel.

28. The apparatus of claim 25, wherein the plurality of different function keys associated with a touch-screen input and display device comprise a plurality of different "soft" function keys that are selected and generated on the input and display device display by the at least one computer program.

29. The apparatus of claim 28, wherein the selection of the soft function keys depends at least in part on a display context determined by a user selection received via the input and display device, the user selection relating to a topical area.

30. The apparatus of claim 29, wherein the topical area comprises either finance or weather, and the received input from a user via one of a plurality of different function keys associated with the touch-screen input and display device comprises a request for stock quotes or a weather forecast for a particular location, respectively.

31. Computer readable apparatus comprising a storage medium, said storage medium comprising at least one computer program with a plurality of instructions, said at least one program being configured to:

receive input from a user via a first soft function key associated with a touch-screen input and display device;

cause generation of a plurality of different soft function keys on the input and display device, the different soft functions keys each having a context associated therewith and being selected based at least in part on the received input;

receive a second input via one of the generated plurality of soft function keys;

facilitate selection of advertising content based at least in part on the context associated with the one generated soft function key associated with the second input;

receive the selected content; and present the selected advertising content via the input and display device for viewing by the user.

32. The apparatus of claim 31, wherein the one of the generated plurality of soft function keys via which the second input is received is associated with a geographic location, and the selected advertising content is related to one or more business entities at or proximate to that location.

33. The apparatus of claim 31, wherein the context associated with the one of the generated plurality of soft function keys via which the second input is received comprises a location having one or more business entities at or proximate to that location, and the selected advertising content is related to an attribute associated with at least one of the one or more business entities.

34. The apparatus of claim 31, wherein the second input relates to a location of a geographic area or point of interest.

35. The apparatus of claim 34, wherein the second input relating to a location comprises an input relating to a point of origin for, or a destination of, travel.

36. The apparatus of claim 31, wherein the plurality of different soft function keys are selected by the at least one computer program.

37. The apparatus of claim 36, wherein the input received from a user via a first soft function key associated with a touch-screen input and display device comprises a user selection relating to a topical area.

38. The apparatus of claim 37, wherein the topical area comprises either finance or weather, and the received second input from a user via one of a plurality of different function keys comprises a request for stock quotes or a weather forecast for a particular location, respectively.

* * * * *